United States Patent
Kalman

(10) Patent No.: US 8,260,078 B2
(45) Date of Patent: Sep. 4, 2012

(54) SYSTEM AND METHOD FOR ADAPTIVELY SHARPENING DIGITAL IMAGES

(75) Inventor: Mark Kalman, San Francisco, CA (US)

(73) Assignee: CISCO TECHNOLOGY, Inc., San Jose, CA (US)

( * ) Notice: Subject to any disclaimer, the term of this patent is extended or adjusted under 35 U.S.C. 154(b) by 905 days.

(21) Appl. No.: 12/353,932

(22) Filed: Jan. 14, 2009

(65) Prior Publication Data

US 2010/0177962 A1    Jul. 15, 2010

(51) Int. Cl.
G06K 9/40    (2006.01)

(52) U.S. Cl. .................................. 382/274; 382/283

(58) Field of Classification Search ............... 345/563, 345/626; 348/241, 252, 606, 625, 661, E5.034; 382/167, 261, 263, 274, 283
See application file for complete search history.

(56) References Cited

U.S. PATENT DOCUMENTS

2011/0229053 A1*    9/2011    Tezaur ..................... 382/266

* cited by examiner

*Primary Examiner* — Gregory F Cunningham
(74) *Attorney, Agent, or Firm* — Patterson & Sheridan, LLP

(57) ABSTRACT

Embodiments of the invention provide a technique to sharpen luminance data associated with each pixel of a digital image without introducing certain sharpening artifacts. An alpha mask is generated based on first, second, and third alpha submasks that indicate how strongly overshoot, color fringe, and dark regions, respectively, are detected at each pixel location. The alpha mask is used to combine luminance data derived from the digital image with sharpened luminance data that is generated by applying a sharpening filter to the luminance data.

13 Claims, 12 Drawing Sheets

SYSTEM AND METHOD FOR ADAPTIVELY SHARPENING DIGITAL IMAGES

BACKGROUND OF THE INVENTION

1. Field of the Invention

The invention relates generally to image processing and, more specifically, to a system and method for adaptively sharpening digital images.

2. Description of the Related Art

Digital camera technology has developed rapidly over the past decade. A broad variety of digital cameras are now available to meet the diverse needs of a wide spectrum of consumers. Digital camera technology provides a user with the ability to capture digital images and/or digital video, and also provides the ability to transfer the recorded digital images and/or digital video to a computer-readable medium, such as a Digital Video Disc (DVD) or a computer memory, or to a physical medium, such as photographic paper.

Additionally, once image data and/or video data is captured by the digital camera, the data may be transferred to a computer system via a cord or connector that couples the digital camera to the computer system. Common types of connectors provided with digital cameras are universal serial bus (USB) connectors, firewire connectors, High-Definition Multimedia Interface (HDMI) connectors, proprietary connectors, or other types of connectors that may be used to transfer data. Some digital cameras may include a cord that connects the digital cameras to the computer system; whereas, other digital cameras may include a connector that protrudes from the digital camera and can be plugged directly into the computer system.

As is known, video data is comprised of a series of digital images. Each digital image is represented by a two-dimensional (2D) grid of pixels that may be displayed on a screen, such as a television set or a computer monitor, or printed on high-quality paper to provide a photographic still image. The color and brightness of the pixels can be represented using different formats. For example, each pixel may be defined by three values that define the brightness of red, green, and blue (RGB) color components associated with the pixel. The brightness value of each color typically falls between 0 and 1, where 0 represents a lack of the color, and 1 represents the maximum brightness of the color. Digital images that are represented as RGB values are referred to herein as "RGB images." Each pixel of the digital image may also be defined by a luminance component (Y) that defines the brightness of the pixel, and two chrominance components (U and V) that define the color of the pixel. Digital images composed of pixels that are represented with YUV components are referred to herein as "YUV images."

RGB images and/or YUV images may be filtered to produce higher-quality digital images. For example, a digital image of either format may be sharpened using a sharpening filter to produce data that, when displayed on a screen, appears clearer. A typical sharpening filter amplifies the differences in brightness from pixel-to-pixel in a digital image. For example, a sharpening filter may modify the luminance component of a YUV image to provide a sharper YUV image. One problem with this approach is that typical sharpening filters often introduce a variety of distortions into the digital image. These distortions are known as "sharpening artifacts" that may be introduced into the digital image under several different circumstances.

For example, sharpening artifacts known as "bright overshoot" and "dark undershoot," known collectively as "overshoot," may be introduced into the digital image by the sharpening filter within regions of the digital image that rapidly transition from a bright area to a dark area. Such a region may be indicative of an edge between different objects represented by the digital image. This effect is illustrated in FIG. 9. As shown, FIG. 9 includes graph 900 of horizontal pixel position versus luminance based on a YUV image, according to the prior art. Original edge 910, represented by a solid line, indicates that the luminance of the YUV image decreases from a first value to a second value across the horizontal line of pixels. The region of the YUV image where this decrease occurs is shown on graph 900 as extended high gradient region 930.

After the YUV image is sharpened, the luminance value decreases more rapidly from the first value to the second value across extended high gradient region 930. However, the luminance value is also increased at the left-most extremity of the extended high gradient region 930, resulting in bright overshoot, and decreased at the right-most extremity of the high gradient region 930, resulting in dark undershoot. Bright overshoot causes excessively bright pixels to appear within a bright region that is near a boundary with a dark region, while dark undershoot causes excessively dark pixels to appear within a dark region that is near a boundary with a bright region. These excessively bright and dark pixels may disrupt the overall quality of the image and may be visually displeasing.

Another type of artifact is known as "color fringe." When the RGB values of the RGB image are in focus, as shown in FIG. 10A, the RGB brightness values each change at the same rate across a boundary between a bright region and a dark region. However, when the RGB values are not in focus, as shown in FIG. 10B, these brightness values may change with different rates across such a boundary, resulting in a fringe near the boundary. Within this fringe, one color appears brighter than the other colors. This may be caused by, among other things, flaws in the lens of the DVC. The brightness of the fringe may be amplified when the image is sharpened due to the effects of overshoot described above, further exacerbating the color fringe and reducing the overall quality of the image.

A third type of artifact, referred to herein as a "dark artifact," occurs when a dark region of a digital image is sharpened. Dark regions of a digital image may include random noise that, when sharpened, appears more pronounced. This amplified noise disrupts the continuity of the dark region and decreases the overall clarity of the digital image.

Accordingly, there remains a need in the art for a technique to sharpen digital images without introducing sharpening artifacts.

SUMMARY OF THE INVENTION

One embodiment of the invention sets forth a computer-implemented method for sharpening a digital image that is H pixels in height and W pixels in width. The method includes the steps of generating a plurality of luminance values for the digital image, where each luminance value corresponds to a different pixel location in the digital image, generating a plurality of sharpened luminance values for the digital image by applying a sharpening filter to one or more of the luminance values, where each sharpened luminance value corresponds to a different pixel location in the digital image, and generating a sharpened digital image for output to a display or for storage in a memory by selecting, for each pixel location in the digital image, either the luminance value in the plurality of luminance values corresponding to the pixel location or the sharpened luminance value in the plurality of sharpened luminance values corresponding to the pixel location based on a value in an alpha mask corresponding to the pixel location.

In various embodiments, the alpha mask is derived from at least one of an overshoot alpha submask that includes, for each pixel location in the digital image, an overshoot value that is indicative of how strongly an overshoot artifact is detected at the pixel location by the sharpening filter, a fringe alpha submask that includes, for each pixel location in the digital image, a fringe value that is indicative of how strongly a fringe artifact is detected at the pixel location by the sharpening filter, and a dark alpha submask that includes, for each pixel location in the digital image, a dark value that is indicative of whether a dark artifact was introduced at the pixel location by the sharpening filter.

Other embodiments of the invention set forth computer-readable media that store instructions that can configure a processing unit to generate the overshoot alpha submask and the fringe alpha submask.

Yet other embodiments of the invention include computer-implemented methods directed to one or more variations of the functionalities that can be implemented via the above computer-readable media as well as electronic devices configured to perform one or more variations of the functionalities that can be implemented via the above computer-readable media.

One advantage of the disclosed techniques is that they provide an adaptive sharpening filter that improves overall image sharpness, but reduces the incidence of sharpening artifacts relative to prior art image sharpening techniques.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

Figure 1:
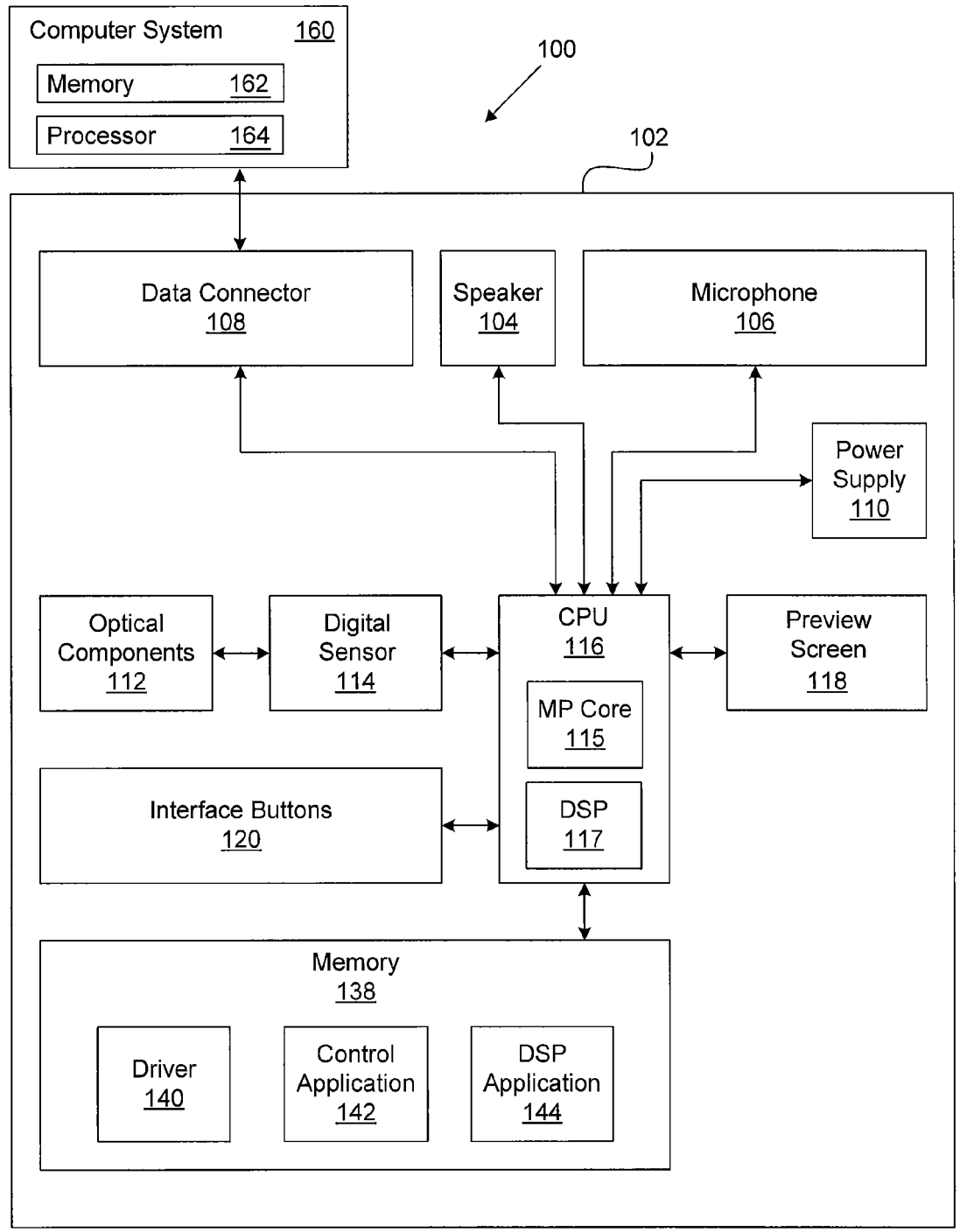
FIG. 1 is a block diagram of a hand-held device configured to implement one or more aspects of the invention.

FIG. 1 is a block diagram of a system 100 configured to implement one or more aspects of the invention. As shown, the system 100 includes a digital camera 102 and a computer system 160. The digital camera 102 includes, without limitation, a data connector 108, a speaker 104, a microphone 106, a power supply 110, optical components 112, a digital image sensor 114, a central processing unit (CPU) 116, a preview screen 118, interface buttons 120, and an internal memory 138. In one embodiment, the digital camera 102 is a one-time use and/or disposable digital camera. In alternative embodiments, the digital camera 102 is a reusable digital camera. In still further embodiments, the digital camera 102 is a digital video camera.

The data connector 108 is an integrated mechanism that allows the digital camera 102 to be coupled to the computer system 160 or to a separate TV, and to transfer data to and from the computer system 160 and/or output video and audio to the TV. The data connector 108 may be a universal serial bus (USB) connector, a firewire connector, a HDMI connector, a serial connector, or another type of connector that is capable of connecting the digital camera 102 with the computer system 160 or the TV. In alternative embodiments, the data connector 108 is not an integrated mechanism and may include a cable connector.

In one embodiment, the digital camera 102 is configured to capture still image data of a particular scene through the optical components 112 and the digital sensor 114. In alternative embodiments, the digital camera 102 may be configured to capture video data through the optical components 112 and the digital sensor 114 and to capture audio of the particular scene through the microphone 106. When the digital camera 102 is in an image capture mode or video capture mode, the preview screen 118 displays a preview of the image to be captured. When in a playback mode, the digital camera 102 is configured to show previously-captured digital images and/or digital videos (comprised of captured video data and audio data) that are stored in the internal memory 138. When the preview screen is displaying previously-captured digital video, the audio data associated with the digital video is output through the speaker 104. In alternative embodiments, the previously-captured digital images and/or digital videos may be output to the TV or to the computer system 160 for playback.

The power supply 110 provides power to the digital camera 102. The power may be provided by a battery or an external power source (e.g., an AC outlet). In one embodiment, the battery is a rechargeable battery that may or may not be removable from the digital camera 102.

The interface buttons 120 include a power button and a capture button. The power button is configured to turn the digital camera ON and OFF. When the digital camera 102 is in the image capture mode, the capture button is configured to initiate the capture of a still image; whereas, when the digital camera 102 is in the video capture mode, the capture button is configured to initiate the capture of a video sequence. In some embodiments, the other interface buttons, which may include a left button, a right button, an increase button, a decrease button, a display button, and/or a delete button, may be implemented as capacitive-touch buttons. In alternative embodiments, these other interface buttons may be implemented as mechanical buttons, induction buttons, analog-resistive buttons, or any other technically feasible button type or combination of button types.

The CPU 116 communicates with the various components within the digital camera 102 to control the operations of the digital camera 102. The CPU may be implemented as a single chip or as a combination of multiple chips. The CPU 116 also processes inputs from the interface buttons 120. For example, when the digital camera 102 is in the image capture mode or the video capture mode, the CPU 116 transmits the data received from the digital sensor 114 to the preview screen 118 for display. Similarly, the CPU 116 may transmit the data to the internal memory 138 for storage. The internal memory 138 also stores firmware that is executed by the CPU 116 to control the operations of the digital camera 102.

The CPU 116 may include a digital signal processor (DSP) 117 and/or a microprocessor (MP) core 115. The DSP 117 includes logic optimized to efficiently perform digital signal processing tasks, such as mathematically intensive computations. In one embodiment, the DSP 117 comprises a co-processor configured to execute instructions independently from the MP core 115. The MP core 115 may be configured to execute a control application 142 stored in the internal memory 138, and the DSP 117 may be configured to execute a DSP application 144, also stored in the internal memory 138. Persons skilled in the art will recognize that the control application 142 and the DSP application 144 may be loaded into the CPU 116 for execution. In one embodiment, the DSP application may reside in embedded memory within the CPU 116.

The internal memory 138 comprises either volatile memory, such as dynamic random access memory (DRAM), or non-volatile memory, such as a hard disk or a flash memory module, or a combination of both volatile and non-volatile memory. The internal memory 138 also stores a software driver 140 implemented as a set of program instructions configured to coordinate operation between the interface buttons 120 and the other components of the digital camera 102.

In various embodiments, the digital camera 102 may be coupled to the computer system 160 via the data connector 108. The computer system 160 may be any type of computing device, such as a laptop or a desktop computer, a server computer, or a video processing kiosk, and includes a memory 162 and a processor 164. Other components included in the computer system 106, such as a display device, a disk drive, user input devices, and the like, are omitted to avoid obscuring embodiments of the invention.

As set forth in greater detail herein, embodiments of the present invention involve techniques for processing image data. The image data may be of any origin. For example, the image data may be associated with one or more still images captured by the digital camera 102 or may be associated with one or more still images derived from video data captured by the digital camera 102. The image data also may be associated with one or more still images stored on the computer system 160 or downloaded to the computer system 160 or may be associated with one or more still images derived from video data stored on the computer system 160 or downloaded to the computer system 160. The image processing techniques disclosed herein may be implemented solely by the processing components within the digital camera 102, when the digital camera 102 is either coupled to or decoupled from the computer system 160, or may be implemented solely by the processing components within the computer system 160, when the digital camera 102 is either coupled to or decoupled from the computer system 160. In other embodiments, the image processing techniques may be implemented in part by the processing components within the digital camera 102 and in part by the processing components within the computer system 160 while the digital camera 102 is coupled to the computer system 160.

Figure 2:
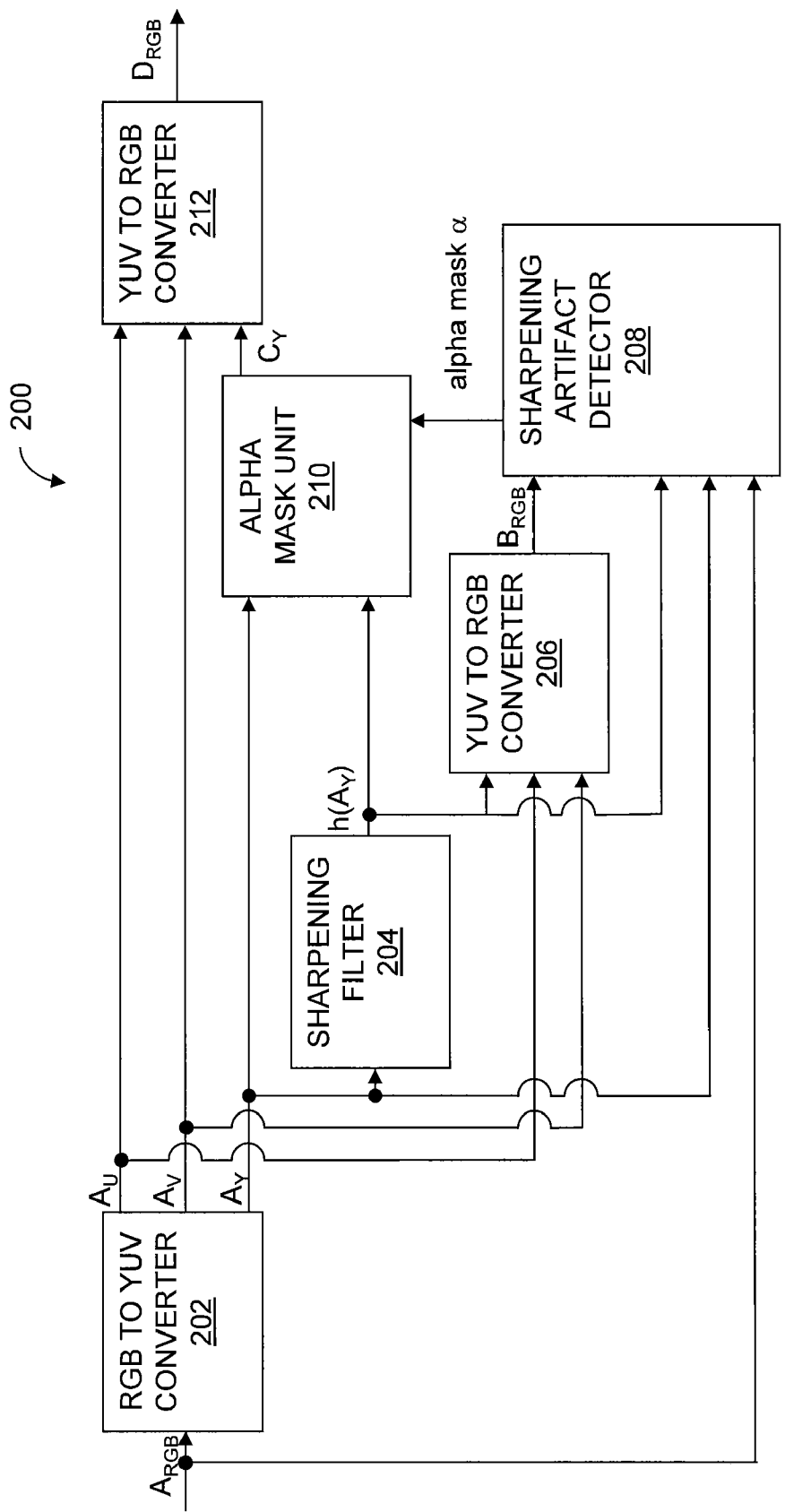
FIG. 2 is a conceptual diagram illustrating an adaptive sharpening filter, according to one embodiment of the invention.

FIG. 2 is a conceptual diagram illustrating an adaptive sharpening filter 200, according to one embodiment of the invention. As shown, the adaptive sharpening filter 200 includes an RGB to YUV converter 202, a sharpening filter 204, a YUV to RGB converter 206, a sharpening artifact detector 208, an alpha mask unit 210, and a YUV to RGB converter 212. The adaptive sharpening filter 200 is configured to receive a digital image that includes a red, green and blue (RGB) color value for each pixel of the digital image, and to generate a sharpened digital image.

The RGB to YUV converter 202 is configured to convert digital RGB data to YUV data. The RGB to YUV converter 202 receives the RBG data, $A_{RGB}$, that is input to the adaptive sharpening filter 200. $A_{RGB}$ is H pixels in height and W pixels in width. Each pixel of $A_{RGB}$ includes an red, a green, and a blue color value that is a decimal and ranges from 0 to 1. In one embodiment, each pixel of $A_{RGB}$ is represented by an 8-bit integer value that ranges from 0 to 255. The RGB to YUV converter 202 generates YUV data, $A_{YUV}$, based on the received digital RGB data. Each pixel of $A_{YUV}$ is defined by a luminance value that defines the brightness of the pixel, and two chrominance values that define the color of the pixel. The luminance values associated with $A_{YUV}$ are included in a luminance array, $A_Y$, while the chrominance components of $A_{YUV}$ are included within separate chrominance arrays, $A_U$, and $A_V$. Each of $A_Y$, $A_U$, and $A_V$, is an H×W array of decimal values ranging from 0 to 1. The RGB to YUV converter 202 transmits $A_Y$ to the sharpening filter 204, to the sharpening artifact detector 208, and to the alpha mask unit 210. The RGB to YUV converter 202 also transmits $A_U$ and $A_V$ to the YUV to RGB converter 206 and to the YUV to RGB converter 212.

The sharpening filter 204 is a linear filter that is configured to perform a sharpening operation. The sharpening filter 204 receives $A_Y$ from the RGB to YUV converter 202 and sharpens the received data to produce sharpened luminance array $h(A_Y)$, where $h(\ )$ is a sharpening function. $h(A_Y)$ includes a sharpened luminance value for each pixel location of the digital image, where each sharpened luminance value is a decimal that ranges from 0 to 1. Those skilled in the art will recognize that a variety of different types of linear filters are readily available and may be implemented, both in software, hardware, or a combination of hardware and software, to implement the sharpening filter 204. The sharpening filter 204 transmits $h(A_Y)$ to the YUV to RGB converter 206, sharpening artifact detector 208, and alpha mask unit 210.

The YUV to RGB converter 206 is configured to convert YUV data to digital RGB data. The YUV to RGB converter 206 receives $h(A_Y)$ from the sharpening filter 204, as well as $A_U$ and $A_V$ from the RGB to YUV converter 202. The YUV to RGB converter 206 then converts the received YUV data into digital RGB data, $B_{RGB}$. $B_{RGB}$ is a sharpened version of $A_{RGB}$ that is the same size as $A_{RGB}$ and includes sharpened RGB color values. The YUV to RGB converter 206 transmits $B_{RGB}$ to the sharpening artifact detector 208.

The sharpening artifact detector 208 is configured to generate an alpha mask α. Alpha mask α is an H×W array of decimal values that range from 0 to 1 and that each correspond to a different pixel location in the digital image. Alpha mask α indicates regions of h($A_Y$) where different sharpening artifacts have been detected. For a given pixel location, an alpha mask α value of 0 at that pixel location indicates that a sharpening artifact is strongly detected in h($A_Y$). Conversely, an alpha mask α value of 1 at a given pixel location indicates that a sharpening artifact is not strongly detected in h($A_Y$).

The sharpening artifact detector 208 receives the original digital RGB data, $A_{RGB}$, as well as $A_Y$, h($A_Y$), and $B_{RGB}$ and generates three alpha submasks that each indicate the likelihood of a different sharpening artifact. Each alpha submask is equal in size and data range to alpha mask α, and each alpha submask includes a value for each pixel of the digital image. The alpha submasks are combined to produce alpha mask α. The first alpha submask, $α_{overshoot}$, is generated from $A_Y$ and h($A_Y$) and identifies regions of h($A_Y$) where an overshoot artifact is detected. $α_{overshoot}$ is described in further detail in FIGS. 4-7. The second alpha submask, $α_{fringe}$, is generated from $B_{RGB}$ and identifies regions of h($A_Y$) where a color fringe artifact is detected. $α_{fringe}$ is described in further detail in FIGS. 6-9. The third alpha submask, $α_{dark}$, is generated from $A_Y$ and identifies dark regions of $A_Y$ where dark artifacts are detected. $α_{dark}$ is described in further detail in FIG. 10.

The sharpening artifact detector 208 is configured to combine $α_{overshoot}$, $α_{fringe}$, and $α_{dark}$ to produce alpha mask α. In one embodiment, alpha mask α is generated according to Equation 1, where the function min(A, B) selects the minimum value of A and B:

$$α=(1-\min(1, α_{overshoot}+α_{fringe}))*(1-α_{dark}) \quad (1)$$

Those skilled in the art will understand that subtracting min(1, $α_{overshoot}+α_{fringe}$) from 1 and subtracting $α_{fringe}$ from 1, as shown in Equation 1, is performed by subtracting each value of min(1, $α_{overshoot}+α_{fringe}$) and $α_{fringe}$ from 1. In one embodiment, each value of $α_{overshoot}$ is added to the corresponding value of $α_{fringe}$ to generate a submask sum, and the function min(1, $α_{overshoot}+α_{fringe}$) generates a limited submask sum. In further embodiments, each value of the limited submask sum is subtracted from 1 to generate a reverse submask, and each value of $α_{fringe}$ is subtracted from 1 to generate a reverse dark alpha submask.

Alpha mask α is transmitted to the alpha mask unit 210. The alpha mask unit 210 is configured to receive alpha mask α, as well as $A_Y$ and h($A_Y$). Alpha mask unit 210 is further configured to combine $A_Y$ and h($A_Y$) using alpha mask α to generate an array of adaptively sharpened luminance values, $C_Y$. $C_Y$ is an H×W array of decimal values that range from 0 to 1. In one embodiment, the alpha mask unit 210 combines $A_Y$ and h($A_Y$) to generate $C_Y$ according to Equation 2:

$$C_Y=((1-α)*A_Y)+(α*h(A_Y)) \quad (2)$$

Those skilled in the art will understand that $C_Y$ is calculated by executing Equation 2 with each value of α and the corresponding value of $A_Y$. In one embodiment, α is subtracted from 1 to generate a reverse alpha mask, each value of the reverse alpha mask is multiplied by the corresponding value of $A_Y$ to generate a first luminance portion, and each value of α is multiplied by the corresponding value of $A_Y$ to generate a second luminance portion.

According to Equation 2, for each pixel value of h($A_Y$), the corresponding value of alpha mask cc determines the fraction of that pixel value that contributes to $C_Y$. In addition, for each pixel value of $A_Y$, 1 minus the corresponding value of alpha mask α determines the fraction of that pixel value that is contributed to $C_Y$. The sum of these contributions determines each pixel value of $C_Y$. Those skilled in the art will recognize that other equations may be used to determine $C_Y$ based on alpha mask α, $A_Y$, and h($A_Y$). Once $C_Y$ has been calculated, the alpha mask unit 210 transmits $C_Y$ to the YUV to RGB converter 212.

The YUV to RGB converter 212 converts YUV data to RGB data. Accordingly, the output of the YUV to RGB converter 212 is adaptively sharpened RGB data, $D_{RGB}$. The YUV to RGB converter 212 is configured to receive $C_Y$, $A_U$, and $A_V$. The YUV to RGB converter 212 is further configured to generate $D_{RGB}$ based on the received data. $D_{RGB}$ is an array of RGB color values that is based on the original chrominance data, $A_U$ and $A_V$, as well as the combined luminance data, $C_Y$, representative of a weighted combination of the original luminance data $A_Y$ and the sharpened luminance data h($A_Y$).

Once the adaptive sharpening filter 200 has generated $D_{RGB}$ from $A_{RGB}$, $D_{RGB}$ may be output to a display screen, such as a cathode-ray tube (CRT) monitor, a liquid crystal display (LCD), a television (TV) set, or other type of display device. $D_{RGB}$ may also be stored in a memory unit or transmitted to a peripheral device such as a printer or copier and printed on a physical medium, such as photo paper. In one embodiment, adaptive sharpening filter 200 is used to process a sequence of digital images to produce adaptively sharpened video data.

In one embodiment, each component of the adaptive sharpening filter 200 described above may be implemented as a hardware component, such as an application-specific integrated circuit (ASIC), a digital signal processor (DSP), or a field-programmable gate array (FPGA), among others. In alternative embodiments, each component of the adaptive sharpening filter 200 may be implemented as a software program stored on a computer-readable medium that, when executed by a processor, performs the specific functionality associated with that component, as described above. In further alternative embodiments, the adaptive sharpening filter 200 may include any combination of hardware and/or software components. As described above in FIG. 1, the adaptive sharpening filter 200 may be executed by the CPU 116 included within the digital camera, or by the processor 164 included in the computer system 160.

Figure 3:
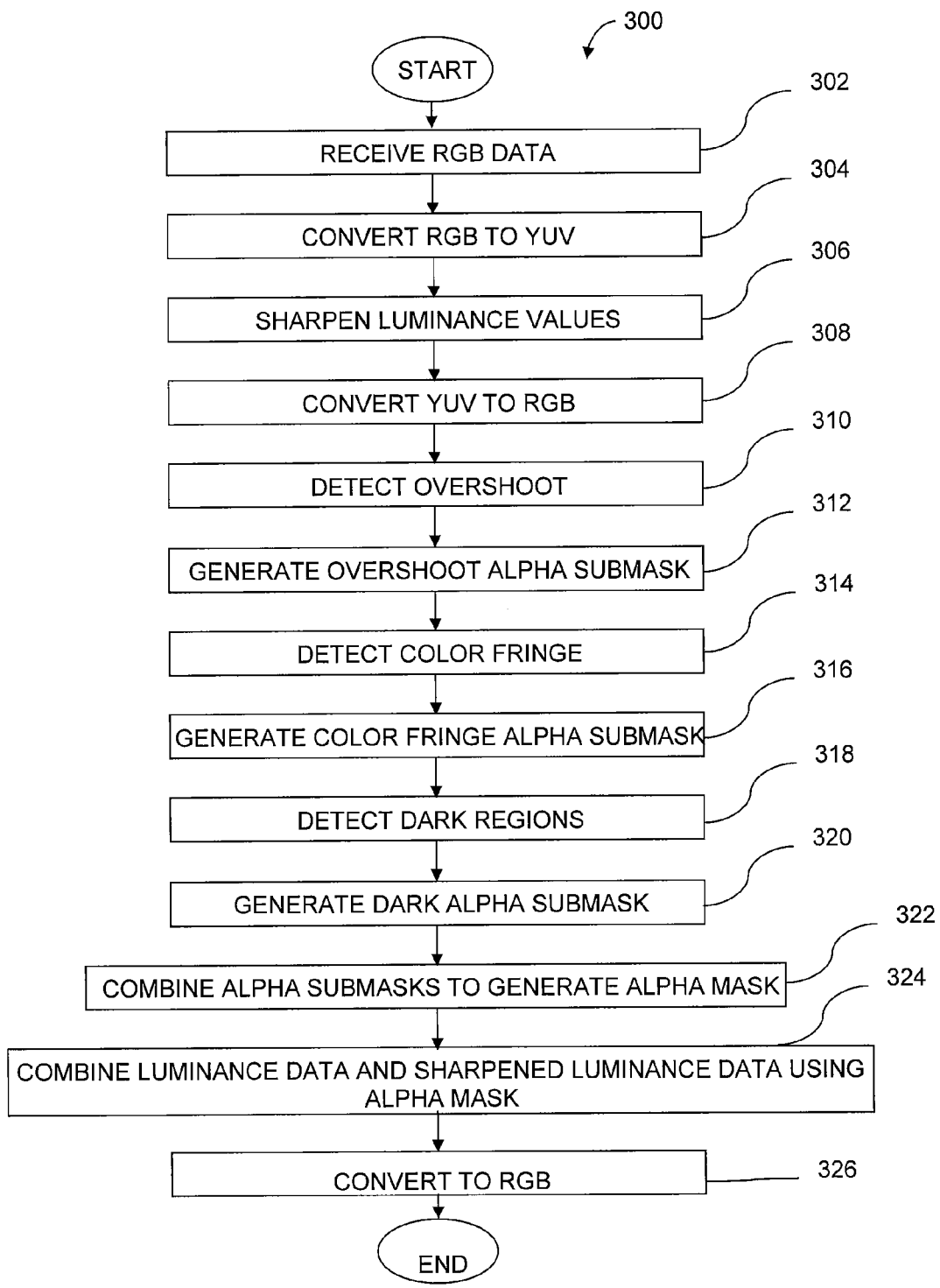
FIG. 3 is a flowchart of method steps for adaptively sharpening a digital image, according to one embodiment of the invention.

FIG. 3 is a flowchart of method steps for adaptively sharpening a digital image, according to one embodiment of the invention. Persons skilled in the art will understand that, even though the method 300 is described in conjunction with the system of FIG. 1-2, any system configured to perform the method steps, in any order, is within the scope of the present invention.

As shown, the method 300 begins at step 302, where the adaptive sharpening filter 200 receives RGB data, $A_{RGB}$. $A_{RGB}$ is an H×W array of RGB color values that each correspond to a different pixel location in the digital image. At step 304, the adaptive sharpening filter 200 converts $A_{RGB}$ to YUV data to produce $A_{YUV}$. $A_{YUV}$ includes a luminance array $A_Y$, and two chrominance arrays $A_U$, and $A_V$, where $A_Y$ includes the luminance values of $A_{YUV}$, and $A_U$ and $A_V$ include the chrominance values of $A_{YUV}$. Each of $A_Y$, $A_U$, and $A_V$ is an H×W array of decimal values ranging from 0 to 1. In one embodiment, the RGB to YUV converter 202 included within the adaptive sharpening filter 200 performs steps 302 and 304.

At step 306, the adaptive sharpening filter 200 performs a sharpening operation using $A_Y$ as input to generate sharpened luminance data, h($A_Y$). h( ) is a sharpening function that implements a linear filter to provide sharpened data. Those skilled in the art will recognize that a wide variety of functions and/or linear filters may be implemented to perform the sharpening operation described herein. In one embodiment, the sharpening filter 204 included within the adaptive sharpening filter 200 performs step 306.

At step 308, the adaptive sharpening filter 200 converts $h(A_Y)$, $A_U$, and $A_V$ into RGB data to produce $B_{RGB}$. $B_{RGB}$ represents a sharpened version of $A_{RGB}$ that is equal in size and data range to $A_{RGB}$. In one embodiment, the YUV to RGB converter 206 included within the adaptive sharpening filter 200 performs step 308.

At step 310, the adaptive sharpening filter 200 identifies regions of $h(A_Y)$ that are likely to include an overshoot artifact. These regions include, for example, a border between a bright area and a dark area. In one embodiment, the adaptive sharpening filter 200 only identifies regions where bright overshoot occurs. In another embodiment, the adaptive sharpening filter 200 only identifies regions where dark undershoot occurs. At step 312, the adaptive sharpening filter 200 generates an alpha submask, $\alpha_{overshoot}$, that is indicative of the regions where an overshoot artifact has been detected. $\alpha_{overshoot}$ is an H×W array of decimal values that range from 0 to 1, where each value corresponds to a pixel location of $h(A_Y)$ and represents the likelihood that an overshoot artifact exists at that pixel location. Those skilled in the art will recognize that a wide variety of techniques may be used to identify regions where overshoot artifacts are likely to occur. One such technique is described in further detail below in FIGS. 4-7.

At step 314, the adaptive sharpening filter 200 identifies regions of $h(A_Y)$ that are likely to include a color fringe artifact. These regions include, for example, a border between a bright and a dark area of $A_{RGB}$ where the R, G, and B color components are focused with different sharpnesses. At step 316, the adaptive sharpening filter 200 generates an alpha submask $\alpha_{fringe}$ that is indicative of the regions where a color fringe artifact is strongly detected. $\alpha_{fringe}$ is an H×W array of decimal values that range from 0 to 1, where each value corresponds to a pixel location of $h(A_Y)$ and represents how strongly a color fringe artifact is detected at that pixel location. Those skilled in the art will recognize that a wide variety of techniques may be used to identify regions where color fringe artifacts may occur. One such technique is described in further detail below in FIGS. 6-9.

At step 318, the adaptive sharpening filter 200 identifies the dark regions of $A_Y$. The dark regions of $A_Y$ often include random noise that, when sharpened, becomes more noticeable. Those skilled in the art will recognize that a wide variety of techniques may be used to identify dark regions of a frame of luminance data. One such technique is described in further detail below in FIG. 10.

At step 320, the adaptive sharpening filter 200 generates an alpha submask $\alpha_{dark}$ of size H×W that includes decimal values at each location that range from 0 to 1. Each value of $\alpha_{dark}$ corresponds to a pixel location of $h(A_Y)$ and represents whether the pixel location falls within a dark region of $h(A_Y)$.

At step 322, the adaptive sharpening filter 200 combines $\alpha_{overshoot}$, $\alpha_{fringe}$, and $\alpha_{dark}$ to produce alpha mask $\alpha$. In one embodiment, the adaptive sharpening filter 200 generates alpha mask $\alpha$ using Equation 1, as previously described. In another embodiment, the sharpening artifact detector 208 included within the adaptive sharpening filter 200 performs steps 310, 312, 314, 316, 318, 320 and 322.

At step 324, the adaptive sharpening filter 200 combines $A_Y$ and $h(A_Y)$ using alpha mask $\alpha$ to produce adaptively sharpened luminance component $C_Y$. $C_Y$ is an H×W array of decimal values ranging from 0 to 1. The values of pixels in $C_Y$ that are located within regions where sharpening artifacts have been strongly detected are calculated based primarily on $A_Y$. The values of pixels in $C_Y$ that are located within regions where sharpening artifacts have not been strongly detected are calculated based primarily on $h(A_Y)$. The adaptive sharpening filter 200 may generate $C_Y$ using Equation 2, as previously described herein. In one embodiment, the alpha mask unit 210 included within the adaptive sharpening filter 200 performs step 324.

At step 326, the adaptive sharpening filter 200 converts $C_Y$, $A_U$, and $A_V$ into adaptively sharpened RGB data $D_{RGB}$. $D_{RGB}$ includes color data derived from the original $A_{RGB}$ data. The luminance component $C_Y$ associated with $D_{RGB}$ is based on a combination of the original luminance $A_Y$ and the sharpened luminance $h(A_Y)$. In one embodiment, the YUV to RGB converter 212 included within the adaptive sharpening filter 200 performs step 326.

$D_{RGB}$ may be output to a display, such as a CRT, LCD or TV screen, or printed on a physical medium, such as photo paper, using a printing device. In one embodiment, the adaptive sharpening filter 200 adaptively sharpens a single frame of RGB data. In alternative embodiments, the adaptive sharpening filter 200 sharpens a sequence of frames of RGB data to provide adaptively-sharpened video data.

As described above, the adaptive sharpening filter 200 generates $\alpha_{overshoot}$, $\alpha_{fringe}$, and $\alpha_{dark}$ to produce alpha mask $\alpha$. In alternative embodiments, alpha mask a is based on any combination of $\alpha_{overshoot}$, $\alpha_{fringe}$, or $\alpha_{dark}$. In the descriptions of FIGS. 4-10 that follow, embodiments of the invention are disclosed that provide techniques to generate $\alpha_{overshoot}$, $\alpha_{fringe}$, and $\alpha_{dark}$.

Figure 4:
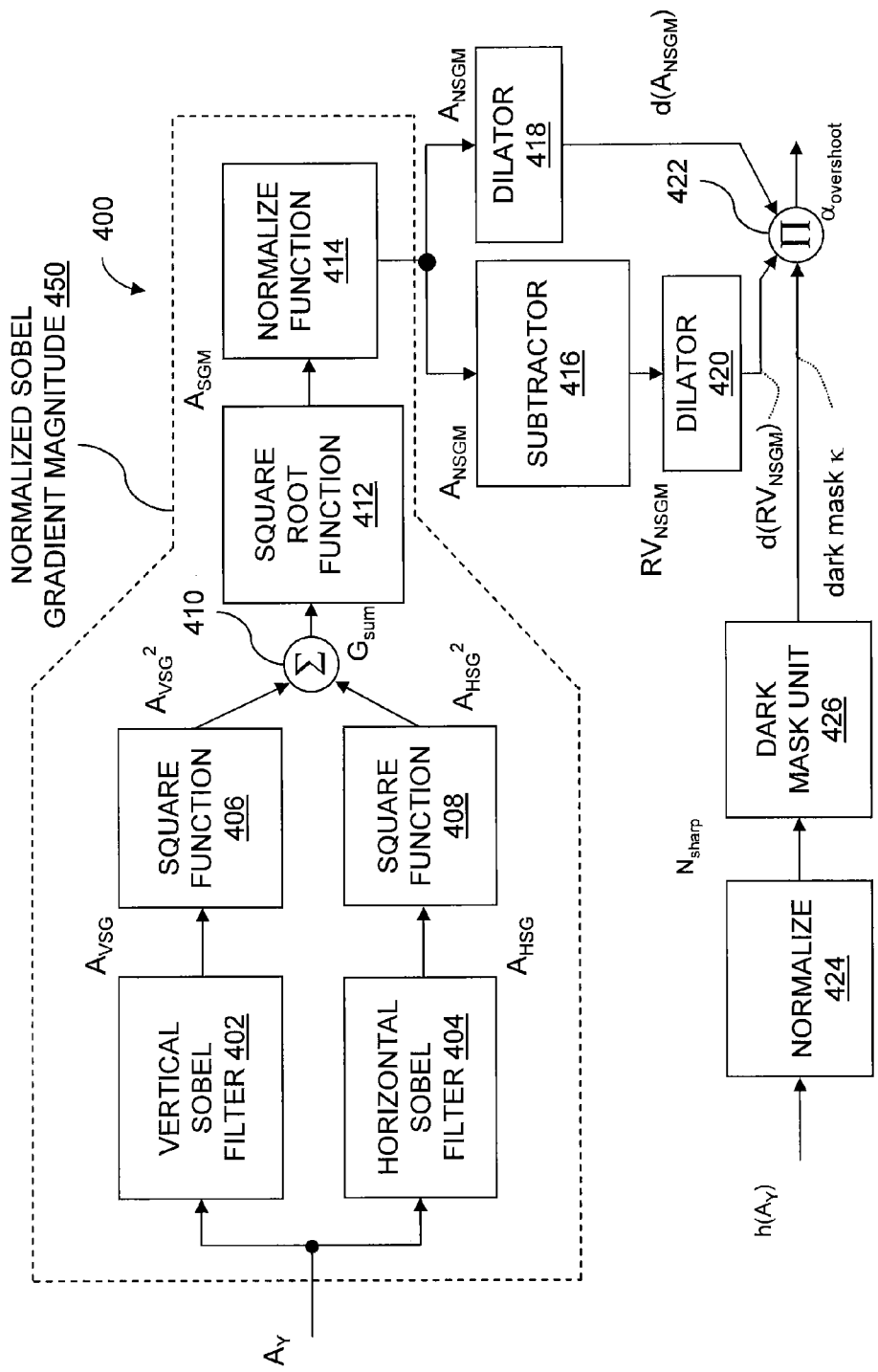
FIG. 4 is a conceptual diagram illustrating an overshoot detector, according to one embodiment of the invention.

FIG. 4 is a conceptual diagram illustrating an overshoot detector 400, according to one embodiment of the invention. As shown, the overshoot detector 400 includes a vertical sobel filter 402, a horizontal sobel filter 404, square functions 406 and 408, a sum 410, a square root 412, a normalize function 414, a subtractor 416, dilators 418 and 420, a multiply 422, a normalize function 424, a dark mask unit 426, and a normalized sobel gradient magnitude 450. The overshoot detector 400 is configured to receive luminance data $A_Y$, sharpened luminance data $h(A_Y)$ and to generate $\alpha_{overshoot}$.

The overshoot detector 400 receives $A_Y$ into the normalized sobel gradient magnitude 450. The normalized sobel gradient magnitude 450 includes the vertical sobel filter 402, the horizontal sobel filter 404, the square functions 406 and 408, the sum 410, the square root function 412, and the normalize function 414. The normalized sobel gradient magnitude 450 receives $A_Y$ and calculates the normalized sobel gradient magnitude of $A_Y$ to generate a set of NSGM values included in an H×W array of NSGM values, denoted as $A_{NSGM}$.

The normalized sobel gradient magnitude 450 receives $A_Y$ into the vertical sobel filter 402 and into the horizontal sobel filter 404. As is well known, a sobel filter calculates the gradient of pixel values across a horizontal or a vertical line of pixels within a frame of data in order to detect edges within the frame of data. Those skilled in the art will recognize that, in addition to the sobel filter, other techniques may also be used to detect edges within a frame of data. The vertical sobel filter 402 calculates the gradient of $A_Y$ across a vertical line of pixels to generate a vertical sobel gradient (VSG) for each pixel location of the digital image. Each VSG value is included in an H×W array of VSG values, denoted as $A_{VSG}$. The vertical sobel filter 402 transmits the $A_{VSG}$ to the square function 406. Square function 406 squares each value of $A_{VSG}$ and then transmits $A_{VSG}^2$ to sum 410.

The horizontal sobel filter 404 calculates the gradient of $A_Y$ across a horizontal line of pixels to generate a horizontal sobel gradient (HSG). Each HSG value is included in an H×W array of HSG values, denoted as $A_{HSG}$. The horizontal sobel filter 404 transmits $A_{HSG}$ to the square function 408. The square function 408 squares each value of $A_{HSG}$ and then transmits $A_{HSG}^2$ to sum 410.

Sum 410 adds each pixel value of $A_{VSG}^2$ to the corresponding pixel value of $A_{HSG}^2$ to generate a combined gradient denoted $G_{sum}$. Sum 410 then transmits $G_{sum}$ to the square root function 412. The square root function 412 calculates the square root of each value of $G_{sum}$ to generate a sobel gradient magnitude (SGM) for each pixel location of the digital image. Each SGM value is included in an H×W array of SGM values denoted as $A_{SGM}$. The square root function 412 transmits $A_{SGM}$ to the normalize function 414. The normalize function 414 identifies the maximum value of $A_{SGM}$ and then divides every value of $A_{SGM}$ by the maximum value. Those skilled in the art will understand that in order to determine the maximum pixel value, each pixel value is analyzed and the maximum pixel value is determined as the pixel value that exceeds all of the other pixel values. The result of this operation is an array of NSGM values corresponding to each pixel location of the digital image. Each NSGM value is included in an H×W array of NSGM values denoted as $A_{NSGM}$ Each NSGM value output by the normalized sobel gradient magnitude 450 corresponds to a value of $A_Y$ and indicates whether a pixel within a given region of $A_Y$ is located on a border between a high-luminance region and a low-luminance region of $A_Y$ (i.e., a region where the magnitude of the gradient of $A_Y$ is high). When a pixel is located on such a border, the NSGM value at the pixel location associated with the pixel is close to 1. When a pixel is located within a region of $A_Y$ where the luminance value is relatively constant over a broad area, the NSGM value corresponding to that pixel location will be close to zero. Typically, a border between a high-luminance region and a low-luminance region within $A_Y$ is associated with one or more edges of objects that may be included within the original RGB data received by the adaptive sharpening filter 200. Accordingly, normalized sobel gradient magnitude 450 may be used to identify the pixel locations associated with $A_Y$ where edges are likely to occur.

Those skilled in the art will recognize that the processing operations performed by the vertical sobel filter 402, the horizontal sobel filter 404, the square function 406 and 408, the sum 410, the square root function 412, and the normalize function 412 to generate $A_{NSGM}$, as described above, represent one possible technique that may be used to generate a normalized sobel gradient magnitude. In other embodiments, the normalized sobel gradient magnitude 450 generates each NSGM value using a different sequence of processing operations.

Those skilled in the art will further recognize that normalized sobel gradient magnitude 450 represents just one technique for identifying pixel locations in a digital image where edges are detected and, further, that alternative techniques are also available that may produce results similar to those produced by normalized sobel gradient magnitude 450. Accordingly, normalized sobel gradient magnitude 450 may be replaced by an alternative technique capable of identifying pixel locations associated with $A_Y$ where edges are detected without substantially altering the overall functionality of the overshoot detector 400.

The normalized sobel gradient magnitude 450 transmits $A_{NSGM}$ to the subtractor 416 and to the dilator 418. The subtractor 416 is configured to subtract each value of $A_{NSGM}$ from 1 to generate a reverse NSGM for each pixel location of the digital image. Each reverse NSGM is included in a reverse NSGM array denoted as $RV_{NSGM}$, which is an array that is the same size and data range as $A_{NSGM}$ (i.e., an H×W array of decimal values that range from 0 to 1). $RV_{NSGM}$ represents regions where edges are not strongly detected. Accordingly, when a pixel is located within a region of $A_Y$ where the luminance is relatively constant over a broad area, the $RV_{NSGM}$ value corresponding to that pixel location will be close to 1. The subtractor 416 transmits $RV_{NSGM}$ to the dilator 420.

Dilators 418 and 420 receive an H×W array of data, where each value in the array corresponds to a pixel location. For each pixel location associated with the received array, dilators 418 and 420 determine the maximum pixel value within a certain neighborhood of pixels surrounding the pixel location. Those skilled in the art will understand that in order to determine the maximum pixel value within a certain neighborhood of pixel values, each pixel value in the neighborhood is analyzed and the maximum pixel value is determined as the pixel value that exceeds all of the other pixel values in the neighborhood. Dilators 418 and 420 generate an H×W dilated version of the received array, where each pixel value of the dilated version of the received array corresponds to the maximum value determined from the neighborhood associated with the pixel location in the received array.

Dilator 418 receives $A_{NSGM}$ from the normalized sobel gradient magnitude 450 and performs the dilation operation described above. In one embodiment, the neighborhood of pixels surrounding each pixel location is a P×Q rectangular neighborhood, where P and Q are integers. Those skilled in the art will recognize that neighborhoods of other sizes and shapes are also possible. Dilator 418 dilates $A_{NSGM}$ to generate a dilated version of $A_{NSGM}$ denoted as $d(A_{NSGM})$. $d(A_{NSGM})$ indicates regions of $A_Y$ that are near pixels having a high gradient. For example, if $A_Y$ includes a distinct edge where a high-luminance region borders a low-luminance region, pixels located along the distinct edge have a high gradient. The corresponding locations in $d(A_{NSGM})$, as well as the nearby locations, will have a value that is close to 1. Dilator 418 transmits $d(A_{NSGM})$ to multiply 422.

Dilator 420 receives $RV_{NSGM}$ from subtractor 416 and performs the dilation operation described above. In one embodiment, the neighborhood of pixels is equivalent to the neighborhood implemented by dilator 418. Those skilled in the art will recognize that neighborhoods of other sizes and shapes are possible. Dilator 420 dilates $A_{NSGM}$ to generate a dilated reverse NSGM denoted as $d(R_{NSGM})$. $d(RV_{NSGM})$ indicates regions of $A_Y$ that are near pixels that have a low gradient. For example, if $A_Y$ includes a broad, low-luminance region or a broad, high-luminance region, pixels within that region have a low gradient. The corresponding locations in $d(RV_{NSGM})$, as well as the nearby locations, then have a value that is close to 1. Dilator 420 transmits $d(RV_{NSGM})$ to multiply 422.

The overshoot detector 400 also receives $h(A_Y)$ into the normalize function 424. The normalize function 424 performs the same operation as the normalize function 414. The normalize function 424 generates a normalized luminance value for each pixel location of the digital image. Each normalized luminance value is included in a normalized luminance array, denoted as $N_{sharp}$, which is an H×W array of decimal values ranging from 0 to 1, based on $h(A_Y)$. The normalize function 424 transmits $N_{sharp}$ to the dark mask unit 426.

The dark mask unit 426 identifies dark regions of $h(A_Y)$. The dark mask unit 426 generates dark mask κ, which is an H×W array of decimal values that range from 0 to 1. Each value of dark mask κ represents a measure of the darkness of the corresponding pixel within $h(A_Y)$. In one embodiment, the dark mask κ is generated according to Equation 3:

$$\left(k = \max\left(0, \begin{cases} 1 - h(A_Y) & h(A_Y) < t \\ 1 - t - a(h(A_Y) - t) & \text{otherwise} \end{cases}\right)\right) \quad (3)$$

Those skilled in the art will understand that the two equations shown above, representing different components of Equation 3, are calculated using each value of $h(A_Y)$. Those skilled in the art will also recognize that other techniques for detecting dark regions of $h(A_Y)$ are possible. In one embodiment, t=0.05 and a=15.

Figure 9:
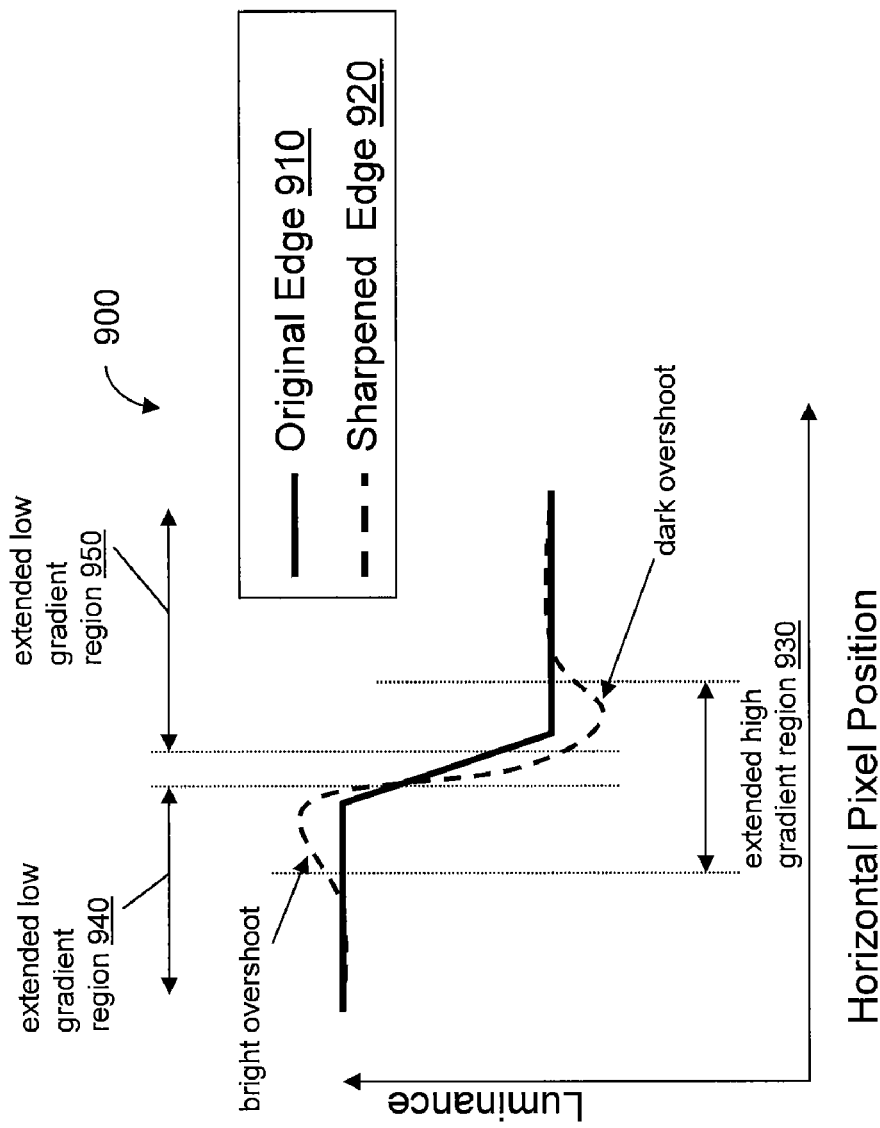
FIG. 9 is a graph representing an overshoot artifact, according to the prior art.
Figure 10B:
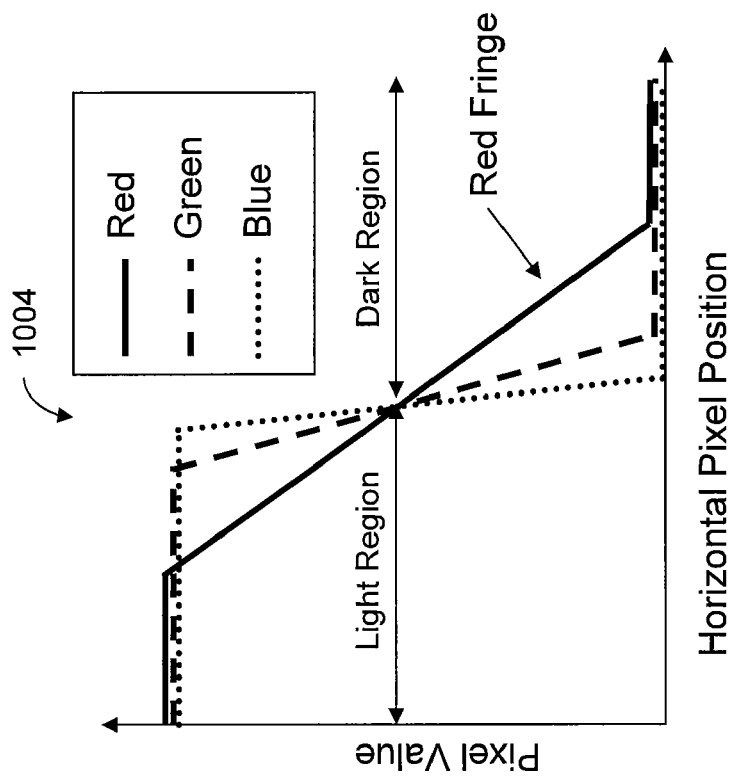
FIG. 10B is a graph representing a color fringe artifact, according to the prior art.
Figure 10A:
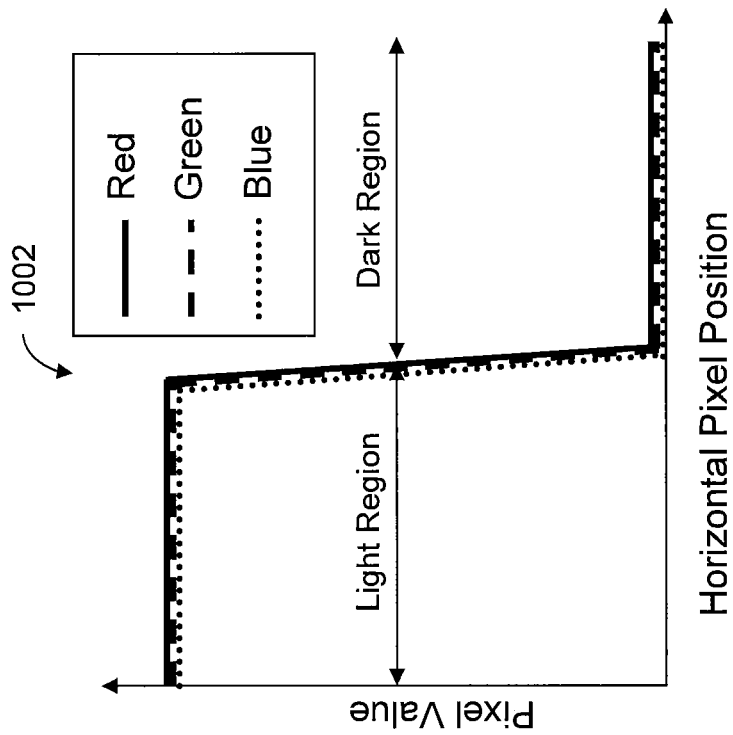
FIG. 10A is a graph representing focused red, green and blue (RGB) intensity values, according to the prior art.

The dark mask unit 426 transmits dark mask κ to multiply 422. Multiply 422 receives dark mask κ, $d(RV_{NSGM})$, and $d(A_{NSGM})$ and multiplies each corresponding element of dark mask κ, $d(RV_{NSGM})$, and $d(A_{NSGM})$ together to generate $\alpha_{overshoot}$. $\alpha_{overshoot}$ indicates the regions of $h(A_Y)$ where a high gradient region borders a low gradient region and, additionally, $h(A_Y)$ is dark. Referring to FIG. 9, $\alpha_{covershoot}$ indicates regions of $h(A_Y)$ where extended high gradient region 930 overlaps extended low gradient region 950. Within this region, overshoot is likely to occur.

In one embodiment, multiply 422 multiplies each value of $d(RV_{NSGM})$ to a corresponding value of and $d(A_{NSGM})$ to generate a boundary mask that indicates regions of the digital image that fall on the edge of a boundary between a high-gradient region and a low-gradient region. Referring again to FIG. 9, such a region is represented by the overlap between extended high gradient region 930 and extended low gradient region 940, and also by the overlap between extended high gradient region 930 and extended low gradient region 950.

In one embodiment, each component of the overshoot detector 400 described above may be implemented as a hardware component, such as an application-specific integrated circuit (ASIC), a digital signal processor (DSP), or a field-programmable gate array (FPGA), among others. In alternative embodiments, each component of the overshoot detector 400 may be implemented as a software program stored on a computer-readable medium that, when executed by a processor, performs the specific functionality associated with that component, as described above. In further alternative embodiments, the overshoot detector 400 may include any combination of hardware and/or software components.

Figure 5:
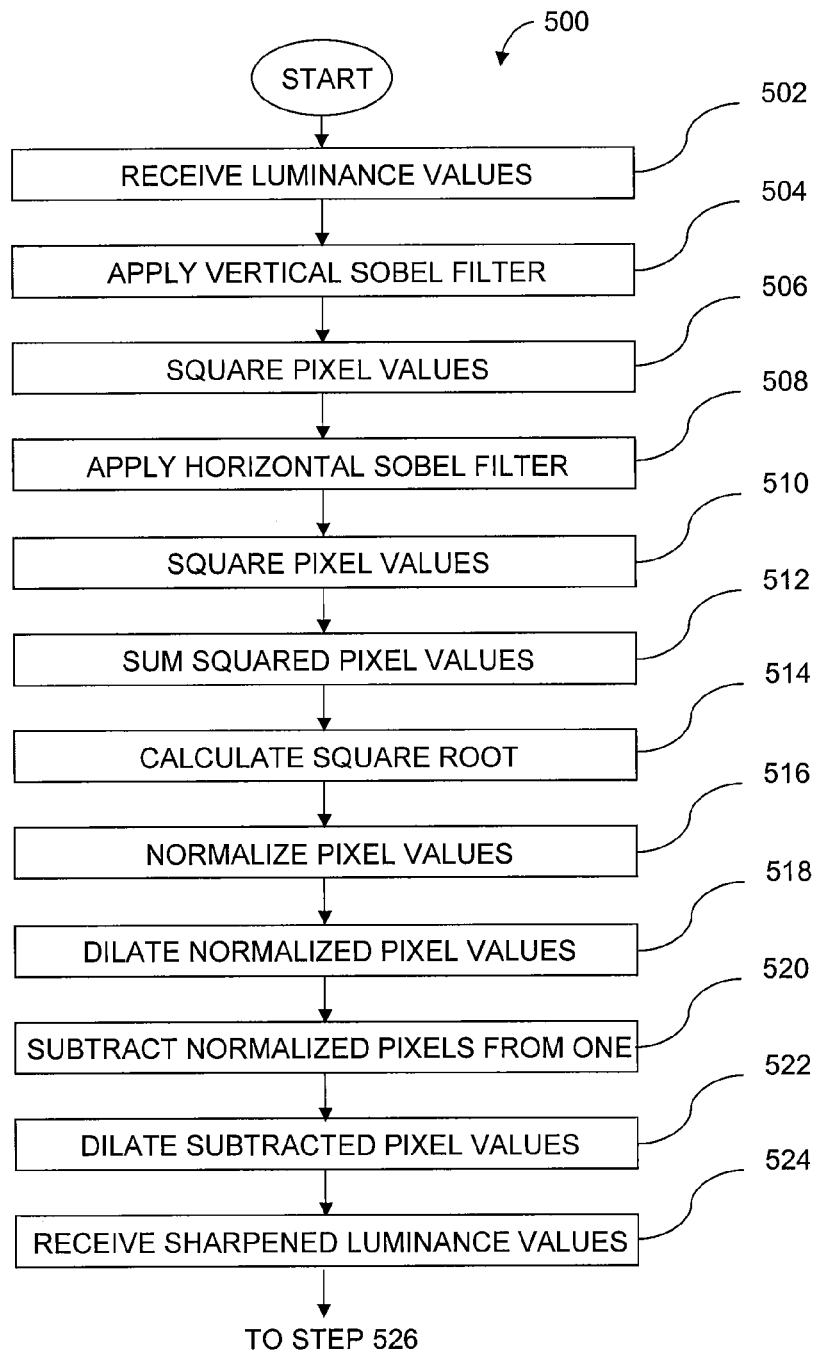
FIG. 5 is a flowchart of method steps for generating an overshoot alpha submask, according to one embodiment of the invention.
Figure 5:
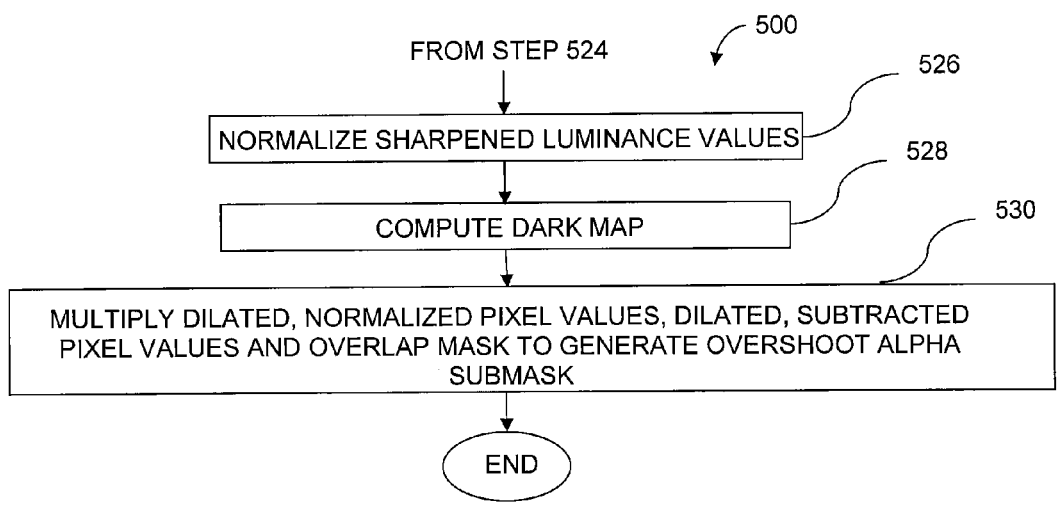

FIG. 5 is a flowchart of method steps for generating an overshoot alpha submask, according to one embodiment of the invention. Persons skilled in the art will understand that, even though the method 500 is described in conjunction with the system of FIGS. 1-2 and 4, any system configured to perform the method steps, in any order, is within the scope of the present invention.

As shown, the method 500 begins at step 502, where the overshoot detector 400 receives an array of luminance data, $A_Y$, derived from the RGB data input to the adaptive sharpening filter 200. At step 504, the overshoot detector 400 executes a vertical sobel filter using $A_Y$ as input to generate a vertical sobel gradient (VSG) for each pixel location of the digital image. The VSG is indicative of edges in the digital image. In one embodiment, an alternative type of filter is used to detect edges in the digital image. Each VSG value is included in an H×W array of decimal values denoted as $A_{VSG}$. In one embodiment, the vertical sobel filter 402 included with the overshoot detector 400 receives $A_Y$ and performs step 504. At step 506, the overshoot detector 400 squares each value of $A_{VSG}$ to generate $A_{VSG}^2$. $A_{VSG}^2$ has the same dimensions as $A_{VSG}$. In one embodiment, the square function 406 included within the overshoot detector 400 performs step 506.

At step 508, the overshoot detector 400 executes a horizontal sobel filter using $A_Y$ as input to generate horizontal sobel gradient (HSG) for each pixel location of the digital image. The HSG is indicative of edges in the digital image. In one embodiment, an alternative type of filter is used to detect edges in the digital image. Each HSG value is included in an H×W array of decimal values denoted as $A_{HSG}$. In one embodiment, the horizontal sobel filter 404 included with the overshoot detector 400 receives $A_Y$ and performs step 508. At step 510, the overshoot detector 400 squares each value of $A_{HSG}$ to generate $A_{HSG}^2$. $A_{HSG}^2$ has the same dimensions as $A_{HSG}^2$. In one embodiment, the square function 408 included within the overshoot detector 400 performs step 510.

At step 512, the overshoot detector 400 adds each value of $A_{VSG}^2$ to the corresponding value of $A_{HSG}^2$ to generate a combined gradient denoted as $G_{SUM}$. $G_{SUM}$ has the same dimensions as both $A_{VSG}^2$ and $A_{HSG}^2$. In one embodiment, the sum 410 included within the overshoot detector 400 performs step 512. At step 514, the overshoot detector 400 calculates the square root of each value of $G_{SUM}$ to generate a sobel gradient magnitude (SGM) for each pixel location of the digital image. Each SGM value is included within an H×W array of decimal values denoted as $A_{SGM}$. In one embodiment, the square root function 412 included within the overshoot detector 400 performs step 514.

At step 516, the overshoot detector 400 normalizes $A_{SGM}$ by dividing each value of $A_{SGM}$ by the maximum value of $A_{SGM}$ to generate $A_{NSGM}$. $A_{NSGM}$ is an H×W array of decimal values that range from 0 to 1. $A_{NSGM}$ indicates high-gradient regions of $A_Y$, such as sharp boundaries between dark regions and bright regions within $A_Y$. In one embodiment, the normalize function 414 included within the overshoot detector 400 performs step 516. In another embodiment, the normalized sobel gradient magnitude 450 performs steps 504, 506, 508, 510, 512, 514, and 516.

At step 518, the overshoot detector 400 performs a dilation operation with $A_{NSGM}$ to generate a dilated NSGM for each pixel value in the digital image. Each dilated NSGM is included in an H×W array denoted as $d(A_{NSGM})$. $d(A_{NSGM})$ is generated as follows: For each pixel location within $A_{NSGM}$, the overshoot detector 400 determines the maximum pixel value of $A_{NSGM}$ within a certain neighborhood of the pixel location. The overshoot detector 400 then generates $d(A_{NSGM})$ comprising the maximum values corresponding to each pixel location. In one embodiment, the neighborhood is a P×Q rectangle, where P and Q are integers. In another embodiment, the dilator 418 included within the overshoot detector 400 performs step 518.

At step 520, the overshoot detector 400 subtracts each value of $A_{NSGM}$ from 1 to generate a reverse NSGM for each pixel location in the digital image. Each reverse NSGM is included in an H×W array denoted as $RV_{NSGM}$. $RV_{NSGM}$ indicates low-gradient regions of $A_Y$, such as broad, low-luminance areas or broad, high-luminance areas. In one embodiment, subtractor 416 included within the overshoot detector 400 performs step 520. At step 522, the overshoot detector 400 performs a dilation operation with $RV_{NSGM}$ to generate a dilated reverse NSGM for each pixel location in the digital image. Each dilated reverse NSGM is included in an H×W array denoted as $RV_{NSGM}$. The dilation operation performed by the overshoot detector 400 is substantially similar to the dilation operation described in step 518. In one embodiment, a different neighborhood is used than the neighborhood described in step 518. In another embodiment, the dilator 420 included within the overshoot detector 400 performs step 522.

At step 524, the overshoot detector 400 receives sharpened luminance array $h(A_Y)$. At step 526, the overshoot detector 400 normalizes $h(A_Y)$ by dividing each value of $h(A_Y)$ by the maximum value of $h(A_Y)$. The result of this operation is $N_{sharp}$, which is an H×W array of normalized sharpened luminance values. In one embodiment, the normalize function 424 included within the overshoot detector 400 performs step 526. At step 528, the overshoot detector 400 generates an dark mask K based on $N_{sharp}$. Dark mask κ is an H×W array of decimal values that indicates low-luminance regions of h($A_Y$). In one embodiment, dark mask κ indicates high-luminance regions of h($A_Y$). In another embodiment, the dark mask unit 426 included within the overshoot detector 400 performs step 528.

At step 530, the overshoot detector 400 multiplies each corresponding value of d($RV_{NSGM}$), d($A_{NSGM}$), and dark mask κ to generate $\alpha_{overshoot}$. $\alpha_{overshoot}$ indicates regions of h($A_Y$) where overshoot artifacts are are strongly detected. In one embodiment, the overshoot detector 400 multiplies the value of d($RV_{NSGM}$) at each pixel location by the value of d($A_{NSGM}$) at the pixel location to generate a boundary mask. The overshoot detector 400 then multiplies the value of the boundary mask at each pixel location by the value of the dark mask at the pixel location.

In another embodiment, $\alpha_{overshoot}$ is used to combine $A_Y$ with h($A_Y$) to generate composite luminance data such that each pixel value of the composite luminance data is determined based on a weighted sum of pixel values drawn from $A_Y$ and h($A_Y$), where the weight values for $A_Y$ and h($A_Y$) are 1−$\alpha_{overshoot}$ and $\alpha_{overshoot}$, respectively. RGB data may then be generated using the composite luminance. Embodiments of the invention thus provide a technique to reduce the effects of overshoot artifacts in a sharpened frame of RGB data.

Figure 6:
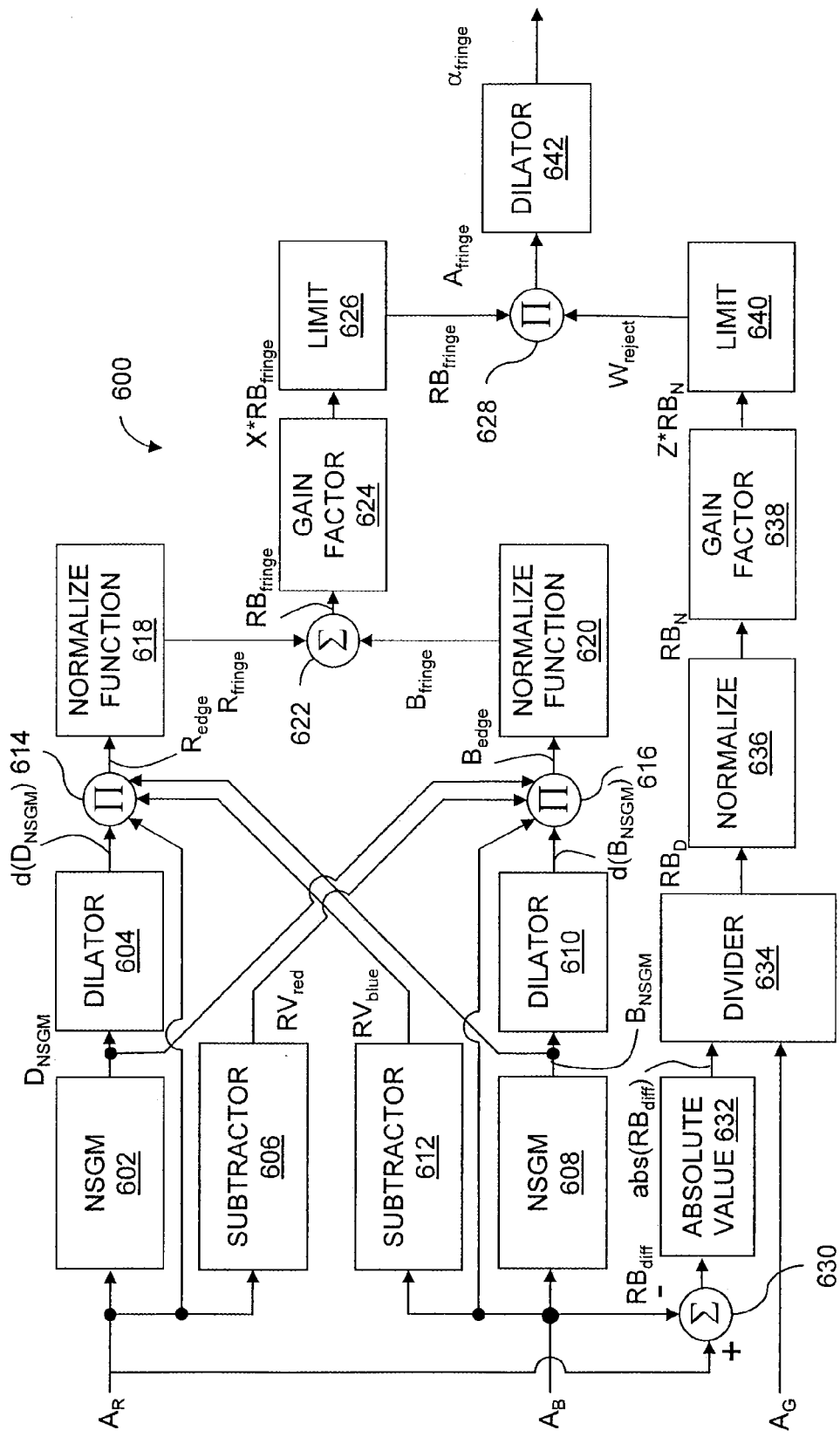
FIG. 6 is a conceptual diagram illustrating a color fringe detector, according to one embodiment of the invention.

FIG. 6 is a conceptual diagram illustrating a color fringe detector 600, according to one embodiment of the invention. As shown, the color fringe artifact detector 600 includes NSGM 602, a dilator 604, a subtractor 606, NSGM 608, a dilator 610, a subtractor 612, a multiply 614, a multiply 616, a normalize function 618, a normalize function 620, a gain factor 624, a limit 626, a multiply 628, a sum 630, an absolute value 632, a divider 634, a normalize function 636, a gain factor 638, a limit 640, and a dilator 642. The color fringe artifact detector 600 is configured to receive $A_R$, $A_G$, and $A_B$ color values associated with the RGB data received by adaptive sharpening filter 200 and to generate $\alpha_{fringe}$. $A_R$, $A_G$, and $A_B$ are each an H×W array of decimal values that range from 0 to 1 that represent the red, green and blue color values, respectively, at each pixel location.

The color fringe artifact detector 600 receives $A_R$ into normalized sobel gradient magnitude (NSGM) 602, subtractor 606, multiply 614, and sum 630. NSGM 602 performs a substantially similar operation as normalized sobel gradient magnitude 450, described above in FIG. 4, to generate a red NSGM for each pixel location of the digital image. Each red NSGM is included in an H×W array denoted as $D_{NSGM}$. $D_{NSGM}$ has the same dimensions as AR and indicates regions of $A_R$ where the luminance of $A_R$ changes rapidly. NSGM 602 transmits $D_{NSGM}$ to dilator 604 and multiply 616.

Dilator 604 receives $D_{NSGM}$ from NSGM 602 and performs a dilation operation to generate a dilated red NSGM for each pixel location of the digital image. Each dilated red NSGM is included in an H×W array denoted as d($D_{NSGM}$). The dilation operation performed by dilator 604 is substantially similar to the dilation operations performed by dilators 418 and 420, described in FIG. 4. In one embodiment, the neighborhood implemented by dilator 604 to perform the dilation operation is different than the neighborhood implemented by the dilators 418 and 420. d($D_{NSGM}$) has the same dimensions as $D_{NSGM}$ and indicates regions of $D_{NSGM}$ near pixel locations that have a high gradient. Dilator 604 transmits d($D_{NSGM}$) to multiply 614.

Subtractor 606 receives $A_R$ and performs a substantially similar operation as the operation performed by subtractor 416 described in FIG. 4 in order to generate a reverse red color value for each pixel location in the digital image. Each reverse red color value is included in an H×W array denoted as $RV_{red}$. Similar to how $A_R$ represents the red color value at each pixel location, $RV_{red}$ represents a lack of red color value at each pixel location. For example, a pixel value of 1 at a particular location in $RV_{red}$ would indicate that the red color value at the corresponding pixel location in $A_R$ equals zero. Subtractor 606 transmits $RV_{red}$ to multiply 616.

The color fringe artifact detector 600 receives $A_B$ into NSGM 608, subtractor 612, multiply 616, and sum 630. NSGM 608 performs a substantially similar operation as normalized sobel gradient magnitude 450, described above in FIG. 4, to generate a blue NSGM for each pixel location in the digital image. Each blue NSGM is included in an H×W array denoted as $B_{NSGM}$. $B_{NSGM}$ has the same dimensions as $A_B$ and indicates regions of $A_B$ where the luminance of $A_B$ changes rapidly. NSGM 608 transmits $B_{NSGM}$ to dilator 610 and to multiply 614.

Dilator 610 receives $B_{NSGM}$ from NSGM 608 and performs a dilation operation to generate a dilated blue NSGM for each pixel location in the digital image. Each dilated blue NSGM is included in an H×W array denoted as d($B_{NSGM}$). The dilation operation performed by dilator 608 is substantially similar to the dilation operations performed by dilators 418 and 420, described in FIG. 4. In one embodiment, the neighborhood implemented by dilator 608 to perform the dilation operation is different than the neighborhood implemented by the dilators 418 and 420. d($B_{NSGM}$) has the same dimensions as d($D_{NSGM}$) and indicates regions of $B_{NSGM}$ that surround pixel locations that have a high gradient. Dilator 604 transmits d($B_{NSGM}$) to multiply 616.

Subtractor 612 receives $A_B$ and performs a substantially similar operation using $A_B$ as input as the operation performed by subtractor 416 described in FIG. 4 in order to generate a reverse blue color value for each pixel location in the digital image. Each reverse blue color value is included in an H×W array denoted as $RV_{blue}$. Whereas $A_B$ represents the blue color value at each pixel location, $RV_{blue}$ represents a lack of blue color value at each pixel location. For example, a pixel value of 1 at a particular location in $RV_{blue}$ would indicate that the blue color value at the corresponding pixel location in $A_B$ equals zero. Subtractor 612 transmits $RV_{blue}$ to multiply 614.

Multiply 614 receives d($D_{NSGM}$), $A_R$, $RV_{blue}$, and $B_{NSGM}$ and multiplies each corresponding element together to generate a red edge value for each pixel location in the digital image. Each red edge value is included in an H×W array denoted as $R_{edge}$. $R_{edge}$ indicates regions of $A_{RGB}$ that have a high red color value, a low blue color value, a high blue gradient, and are nearby regions that have a high red gradient (e.g., regions near an edge having a high red color value). Within such regions, the red color value decreases less rapidly than the blue color value across a border between a high-luminance region and low-luminance region, indicating that the red color values may be focused less sharply than the blue color values. Multiply 614 transmits $R_{edge}$ to normalize function 618. Normalize function 618 performs a normalization function that is substantially similar to that performed by normalize functions 414 and 424 described in FIG. 4 to generate a red fringe value for each pixel location in the digital image. Each red fringe value is included in a red fringe mask, which is an H×W array denoted as $R_{fringe}$. $R_{fringe}$ indicates regions of $A_{RGB}$ where a red color fringe is likely to occur. Normalize function 618 transmits $R_{fringe}$ to sum 622.

Multiply 616 receives d($B_{NSGM}$), $A_B$, $RV_{blue}$, and $D_{NSGM}$ and multiplies each corresponding element together to generate a blue edge value for each pixel location in the digital image. Each blue edge value is included in an H×W array denoted as $B_{edge}$ that indicates regions of $A_B$ that have a high blue color value, a low red color value, a high blue gradient, and are nearby regions that have a high blue gradient (e.g., regions near an edge having a high blue color value). Within such regions, the blue color value decreases less rapidly than the red color value across a border between a high-luminance region and low-luminance region, indicating that the blue color values may be focused less sharply than the red color values. Multiply 616 transmits $B_{edge}$ to normalize function 620. Normalize function 620 performs a normalization function that is substantially similar to that performed by normalize functions 414 and 424 described in FIG. 4 to generate a blue fringe value for each pixel location in the digital image. Each blue fringe value is included in a blue fringe mask, which is an H×W array denoted as $B_{fringe}$. $B_{fringe}$ indicates regions of $A_{RGB}$ where a blue color fringe is likely to occur. Normalize function 620 transmits $B_{fringe}$ to sum 622.

Sum 622 adds each element of $R_{fringe}$ to the corresponding element of $B_{fringe}$ to generate a red-blue mask sum denoted as $RB_{sum}$. $RB_{sum}$ is an H×W array of values. $RB_{sum}$ has the same dimensions as $A_{RGB}$ and indicates regions of $A_{RGB}$ where the red and blue color components may be out of focus. Sum 622 transmits $RB_{sum}$ to the gain factor 624. The gain factor 624 multiplies each element of F by a gain factor X. Gain factor X may be an integer or a decimal value, and may take on a wide range of different values depending on various configurations of the color fringe detector 600. The gain factor 624 transmits $X*RB_{sum}$ to limit 626. Limit 626 sets all values of $X*RB_{sum}$ that are greater than 1 to be equal to 1 to generate $RB_{fringe}$. Limit 626 transmits $RB_{fringe}$ to multiply 628.

The color fringe detector 600 also receives both $A_R$ and $A_B$ into sum 630 and subtracts each pixel value of $A_B$ from the corresponding pixel value of $A_R$ to generate a red-blue difference for each pixel location in the digital image. Each red-blue difference is included in an H×W array denoted as $RB_{diff}$. The absolute value 632 computes the absolute value of each pixel value of $RB_{diff}$ and transmits the result of this operation to the divider 634. The divider receives abs($RB_{diffB}$) as well as $A_G$ and divides abs($RB_{diff}$) by $A_G$ to generate $RB_D$. In one embodiment, the divider 634 adds a small increment ∈ to $A_G$ so that the value of abs($RB_{diff}$) divided by $A_G$ is defined when $A_G$ is equal to 0. $RB_D$ indicates regions of $A_{RGB}$ where the green color value is low and the red color value is much higher than the blue color value or, alternatively, regions of $A_{RGB}$ where the green color value is low and the blue color value is much higher than the red color value. The divider 634 transmits $RB_D$ to the normalize function 636.

The normalize function 636 receives $RB_D$ as input and performs a substantially similar normalization operation as the normalization operation performed by normalize functions 414 and 424, as described in FIG. 4, to generate a normalized red-blue difference for each pixel location of the digital image. Each red-blue difference is included in an H×W array denoted as $RB_N$. The normalize function 636 transmits $RB_N$ to the gain factor 638. Gain factor 638 multiplies each pixel value of $RB_N$ by a gain factor Z. Z may be an integer or a decimal value. Gain factor 638 transmits $Z*RB_N$ to limit 640. Limit 640 limits the values of $Z*RB_N$ that are greater than 1 to be equal to 1 in a similar fashion as limit 626. The result of this operation is a white rejection value for each pixel location in the digital image. Each white rejection value is included in a white rejection mask, which is an H×W array denoted as $W_{reject}$. $W_{reject}$ indicates regions of $A_{RGB}$ where a red color fringe or a blue color fringe may occur. Normalize function 618 transmits $W_{reject}$ to sum 622. Limit 640 transmits $W_{reject}$ to multiply 628.

Multiply 628 receives $RB_{fringe}$ and $W_{reject}$ and multiplies each pixel value of $RB_{fringe}$ by the corresponding pixel value of $W_{reject}$ to generate a combined mask value for each pixel location of the digital image. Each of the combined mask values is included in an H×W array denoted as $A_{fringe}$. Multiply 628 transmits $A_{fringe}$ to the dilator 642. The dilator 642 performs a substantially similar dilation operation as the dilation operation performed by the dilators 418 and 420 using $A_{fringe}$ as input to generate a dilated $A_{fringe}$ value for each pixel location of the digital image. In one embodiment, the dilator 642 uses a different neighborhood to perform the dilation operation than the neighborhood used by dilators 418 and 420. The dilator 642 dilates $A_{fringe}$ to generate $\alpha_{fringe}$.

$\alpha_{fringe}$ is an H×W array of decimal values that range from 0 to 1. Each pixel value of $\alpha_{fringe}$ corresponds to a pixel location in the digital image and is indicative of how strongly a color fringe artifact is detected at the pixel location within a sharpened version of $A_{RGB}$. The color fringe artifact could be a red color fringe or a blue color fringe.

In one embodiment, each component of the color fringe detector 600 described above may be implemented as a hardware component, such as an application-specific integrated circuit (ASIC), a digital signal processor (DSP), or a field-programmable gate array (FPGA), among others. In alternative embodiments, each component of the overshoot detector 400 may be implemented as a software program stored on a computer-readable medium that, when executed by a processor, performs the specific functionality associated with that component, as described above. In further alternative embodiments, the color fringe detector 600 may include any combination of hardware and/or software components.

Figure 7:
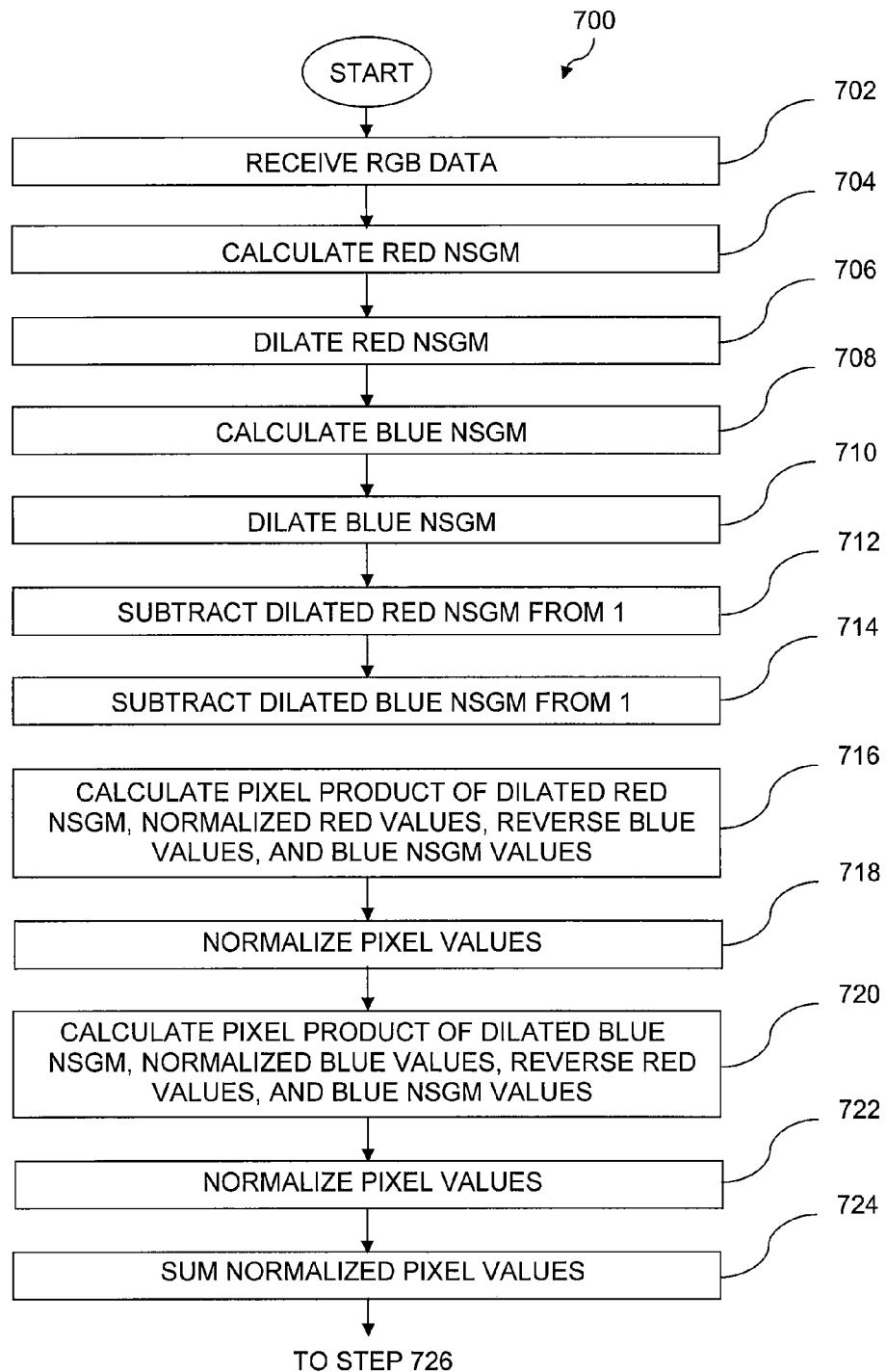
FIG. 7 is a flowchart of method steps for generating a color fringe alpha submask, according to one embodiment of the invention.
Figure 7:
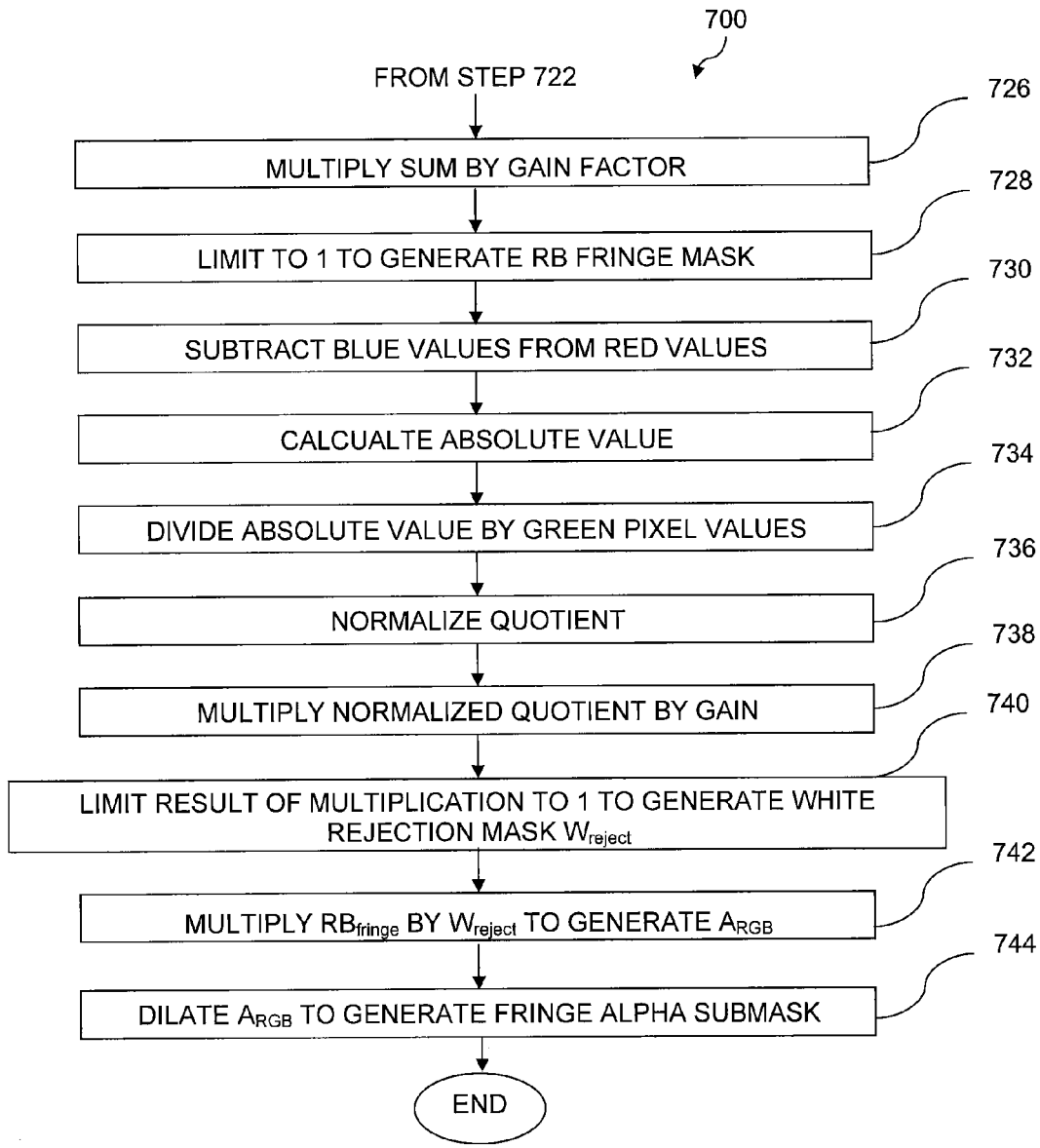

FIG. 7 is a flowchart of method steps for generating a color fringe alpha submask, according to one embodiment of the invention. Persons skilled in the art will understand that, even though the method 600 is described in conjunction with the system of FIGS. 1-2, 4 and 6, any system configured to perform the method steps, in any order, is within the scope of the present invention.

As shown, the method 700 begins at step 702, where the color fringe detector 600 receives a frame of $A_{RGB}$ data comprised of $A_R$, $A_G$, and $A_B$ color components. Each of $A_R$, $A_G$, and $A_B$ is an H×W array of decimal values. In one embodiment, the values of $A_R$, $A_G$, and $A_B$ are normalized to one prior to being input to the color fringe detector 600, so that each pixel value ranges from 0 to 1. Each value of $A_R$, $A_G$, and $A_B$ represents the red, green and blue color values, respectively, at the pixel location.

In one embodiment, the color fringe detector 600 receives $A_R$ into the NSGM 602, the multiply 614, the subtractor 606, and the sum 630, each of which is included within the color fringe detector 600, while performing step 702. In a further embodiment, the color fringe detector 600 receives $A_B$ into the NSGM 608, the multiply 616, the subtractor 612, and the sum 630, each of which is included within the color fringe detector 600, while performing step 702. In yet a further embodiment, the color fringe detector 600 receives $A_G$ into the divider 634 included within the color fringe detector 600 while performing step 702.

At step 704, the color fringe detector 600 calculates a red NSGM value for each pixel location in the digital image using $A_R$ as input to generate $D_{NSGM}$. In one embodiment, the NSGM 602 performs step 702. At step 704, the color fringe detector 600 dilates $D_{NSGM}$ to generate $d(D_{NSGM})$. In one embodiment, the dilator 604 performs step 706.

At step 708, the color fringe detector 600 calculates a blue NSGM for each pixel location in the digital image using $A_B$ as input to generate $B_{NSGM}$. In one embodiment, the NSGM 608 performs step 708. At step 710, the color fringe detector 600 dilates $B_{NSGM}$ to generate $d(B_{NSGM})$. In one embodiment, the dilator 608 performs step 710.

At step 712, the color fringe detector 600 subtracts each value of $A_R$ from 1 to generate $RV_{red}$. In one embodiment, subtractor 612 performs step 712. At step 714, the color fringe detector 600 subtracts each value of $A_B$ from 1 to generate $RV_{blue}$. In one embodiment, subtractor 606 performs step 714.

At step 716, the color fringe detector 600 multiplies each corresponding element of $d(D_{NSGM})$, $A_R$, $RV_{blue}$, and $B_{NSGM}$ to generate an array of red edge values denoted as $R_{edge}$. Each red edge value corresponds to a pixel location of the digital image and indicates regions of $A_{RGB}$ that have a high red color value, a low blue color value, a high blue gradient, and are nearby regions that have a high red gradient (e.g., regions near an edge having a high red color value). Within such regions, the red color value decreases less rapidly than the blue color value across a border between a light region and dark region, indicating that the red color values may be focused less sharply than the blue color values. In one embodiment, multiply 614 performs step 716. At step 718, the color fringe detector 600 performs a normalize function using $R_{edge}$ as input to generate red fringe mask $R_{fringe}$.

At step 720, the color fringe detector 600 multiplies each corresponding element of $d(B_{NSGM})$, $A_B$, $RV_{blue}$, and $D_{NSGM}$ to generate an array of blue edge values denoted as $B_{edge}$. Each blue edge value corresponds to a pixel location of the digital image and indicates regions of $A_{RGB}$ that have a high blue color value, a low red color value, a high red gradient, and are nearby regions that have a high blue gradient (e.g., regions near an edge having a high blue color value). Within such regions, the blue color value decreases less rapidly than the red color value across a border between a light region and dark region, indicating that the blue color values may be focused less sharply than the red color values. In one embodiment, multiply 616 performs step 720. At step 722, the color fringe detector 600 performs a normalize function using $B_{edge}$ as input to generate red fringe mask $B_{fringe}$.

At step 724, the color fringe detector 600 adds each pixel value of $R_{fringe}$ to the corresponding pixel value of $B_{fringe}$ to generate a red-blue mask sum denoted as $RB_{sum}$. $RB_{sum}$ indicates regions where the red and blue color components may be out of focus. In one embodiment, the multiply 622 included within the color fringe detector 600 performs step 724. At step 726, the color fringe detector 600 multiplies each element of $RB_{sum}$ by a gain factor Z. In one embodiment, the gain factor 624 included within the color fringe detector 600 performs step 726. At step 728, the color fringe detector 600 limits the values of $Z*RB_{sum}$ to one by setting each values of $Z*RB_{sum}$ that exceeds 1 to be equal to 1. The result of this operation is a red-blue fringe mask denoted as $RB_{fringe}$. In one embodiment, the limit 626 included within the color fringe detector 600 performs step 728.

At step 730, the color fringe detector 600 subtracts $A_B$ from $A_R$ to generate an array of red-blue differences that each correspond to a pixel location in the digital image. The array of red-blue difference is denoted as $RB_{diff}$. In one embodiment, the sum 630 performs step 730. At step 732, the color fringe detector 600 calculates the absolute value of $RB_{diff}$ for each pixel location. In one embodiment, the absolute value 632 included within the color fringe detector 600 performs step 732. At step 734, the color fringe detector 600 divides each value of $abs(RB_{diff})$ by a corresponding value of $A_G$ to generate $RB_D$. $RB_D$ is an array of values that each correspond to a pixel location of the digital image. $RB_D$ indicates regions of $A_{RGB}$ where the green color value is low and the red color value is much higher than the blue color value or, alternatively, regions of $A_{RGB}$ where the green color value is low and the blue color value is much higher than the red color value. In one embodiment, the divider 634 performs step 734.

At step 736, the color fringe detector 600 normalizes $RB_D$ by determining the maximum value of $RB_D$ and dividing each element of $RB_D$ by the maximum value. The result of this operation is a normalized red-blue difference value for each pixel location of the digital image that indicates regions of the digital image that are not excessively green or white. Each normalized red-blue difference value is included within a normalized red-blue difference mask denoted as $RB_N$, which is an H×W array of decimal values that range from 0 to 1. In one embodiment, the normalize function 636 included within the color fringe detector 600 performs step 736.

At step 738, the color fringe detector 600 multiplies each value of $RB_N$ by a gain factor X. In one embodiment, the gain factor 638 included within the color fringe detector 600 performs step 638. At step 740, the color fringe detector 600 limits the values of $X*RB_N$ to one by setting each value of $X*RB_N$ that exceeds 1 to be equal to 1. The result of this operation is $W_{reject}$. In one embodiment, the limit 640 included within the color fringe detector 600 performs step 640.

At step 742, the color fringe detector 600 multiplies each element of $RB_{fringe}$ with the corresponding element of $W_{reject}$ to generate a value at each pixel location of the digital image. Each of these values is included in a mask denoted as $A_{fringe}$. In one embodiment, multiply 628 included within the color fringe detector 600 performs step 742. At step 744, the color fringe detector 600 performs a dilation operation with $A_{fringe}$ to generate $\alpha_{fringe}$. The method then terminates.

$\alpha_{fringe}$ is an H×W array of decimal values that range from 0 to 1. Each value of $\alpha_{fringe}$ corresponds to a different pixel location in the digital image and represents how strongly a color fringe artifact is detected at the pixel location within a sharpened version of $A_{RGB}$. The color fringe artifact could be a red color fringe or a blue color fringe.

In one embodiment of the invention, $\alpha_{fringe}$ is used to combine $A_Y$ with $h(A_Y)$ to generate composite luminance data such that each pixel value of the composite luminance data is determined based on a weighted sum of pixel values drawn from $A_Y$ and $h(A_Y)$, where the weight values for $A_Y$ and $h(A_Y)$ are $1-\alpha_{fringe}$ and $\alpha_{fringe}$, respectively. RGB data may then be generated using the composite luminance. Embodiments of the invention thus provide a technique to reduce the effects of color fringe artifacts in a sharpened frame of RGB data.

Figure 8:
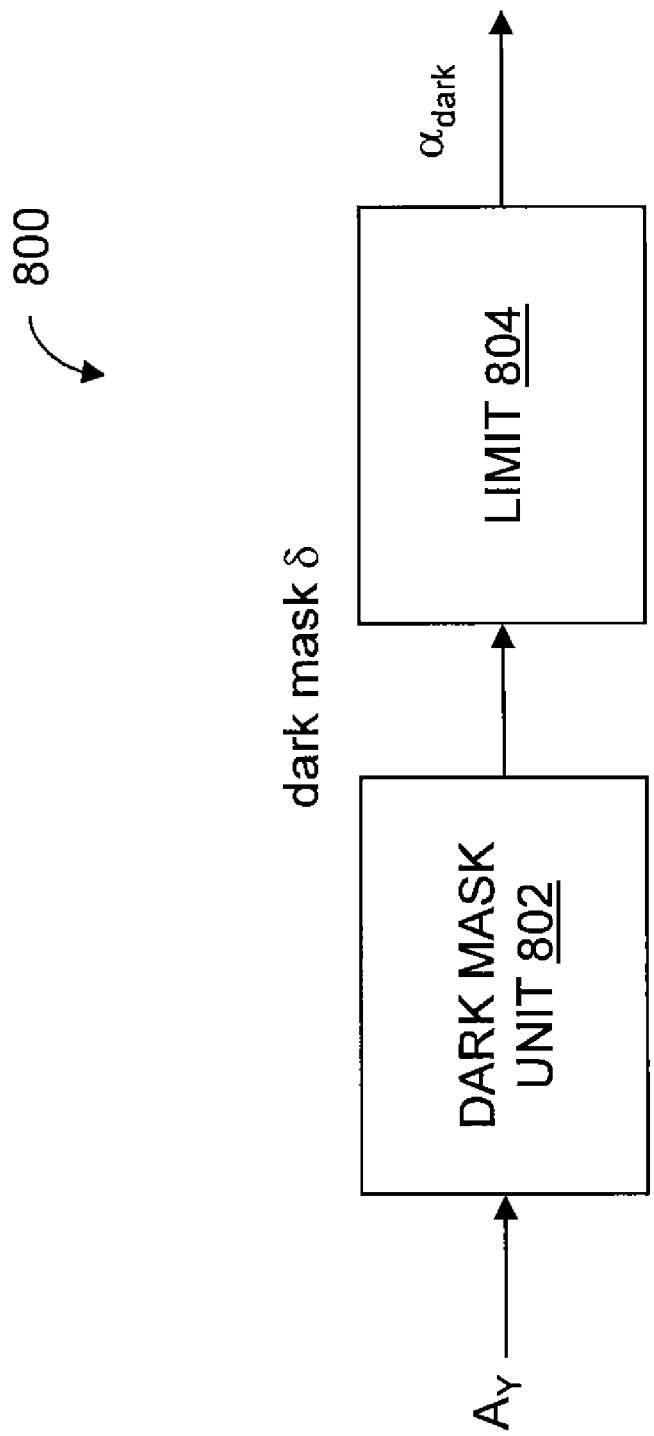
FIG. 8 is a conceptual diagram illustrating a dark artifact detector, according to one embodiment of the invention.

FIG. 8 is a conceptual diagram illustrating a dark artifact detector 800, according to one embodiment of the invention. As shown, the dark artifact detector 800 includes dark mask unit 802 and limit 804. The dark artifact detector 800 generates $\alpha_{dark}$, which is an H×W array of decimal values that range from 0 to 1 that each correspond to a different pixel location of the digital image. Each value of $\alpha_{dark}$ indicates how strongly a dark artifact is detected in sharpened luminance data $h(A_Y)$.

Dark artifact detector 1000 receives $A_Y$ into the dark mask unit 802. The dark mask unit 802 generates dark mask δ that indicates pixel values that are above a certain threshold. In one embodiment, dark mask δ is generated using equation 4, where a and T are parameters:

$$\delta = a^*\left(1 - \frac{A_Y}{T}\right) \qquad (4)$$

Those skilled in the art will understand that Equation 4 is calculated using each value of $A_Y$. Dark mask unit 802 transmits dark mask δ to limit 804. Limit 804 limits the values of dark mask δ to fall between 0 and 1 by setting the values of dark mask δ that are less than 0 to be equal to 0, and by setting the values of dark mask δ that are greater than 1 to be equal to 1. The output of limit 804 is $\alpha_{dark}$. $\alpha_{dark}$ indicates regions of $A_Y$ that are too dark to sharpen without introducing a noticeable increase in noise.

In one embodiment of the invention, $\alpha_{dark}$ is used to combine $A_Y$ with $h(A_Y)$ to generate composite luminance data such that each pixel value of the composite luminance data is determined based on a weighted sum of pixel values drawn from $A_Y$ and $h(A_Y)$, where the weight values for $A_Y$ and $h(A_Y)$ are $1-\alpha_{dark}$ and $\alpha_{dark}$, respectively. RGB data may then be generated using the composite luminance. Embodiments of the invention thus provide a technique to decrease noise in dark areas of a sharpened frame of RGB data.

Although embodiments of the invention described herein are directed towards various operations that may be performed using an H×W array of values as input, where each of those values corresponds to a different pixel in an H×W digital image, persons skilled in the art will recognize that the disclosed operations are equally applicable to a subset of the H×W array of values that corresponds to a subset of the H×W digital image. Any such subset constitutes a "portion" of the digital image, and, in some embodiments, a "portion" may constitute every pixel of the H×W digital image.

In sum, the adaptive sharpening filter generates an alpha mask that indicates how strongly a sharpening artifact is detected at each pixel location. The alpha mask value at each pixel location falls within a range from 0 to 1, where 0 indicates that a sharpening artifact is strongly detected, and 1 indicates that a sharpening artifact is not strongly detected. The alpha mask is used to combine luminance values associated with each pixel location of the original image with sharpened luminance values associated with each pixel location of the sharpened image to produce an adaptively sharpened image.

Each pixel of the adaptively sharpened image is determined by multiplying the luminance value of the sharpened image at the pixel location by the alpha mask value at the pixel location to produce a first product, multiplying the luminance value of the original image at the pixel location by 1 minus the alpha mask value at the pixel location to generate a second product, and then summing the two products. The alpha mask thus determines, for each pixel location of the adaptively sharpened image, a percentage of the adaptively sharpened luminance value contributed by the sharpened image, and a percentage of the adaptively sharpened luminance value contributed by the original image. These percentages are summed to provide the adaptively sharpened luminance value at the pixel location.

The adaptive sharpening filter generates the alpha mask by combining an overshoot alpha submask, a color fringe alpha submask, and a dark region alpha submask. The overshoot alpha submask detects regions of the digital image where dark undershoot is strongly detected. Specifically, the overshoot alpha submask indicates regions of the digital image on a low-luminance side of a border between a high-luminance region and a low-luminance region. The color fringe alpha submask indicates regions of the digital image where the average green color value is low, the average red color value is higher than the average blue color value, and the red color value decreases rapidly across sequential pixel locations. Additionally, the color fringe alpha submask indicates regions of the digital image where the average green color value is low, the average blue color value is higher than the average red color value, and the blue color value decreases rapidly across sequential pixel locations. Color fringe artifacts are strongly detected in these regions. Finally, the dark region alpha submask indicates regions of the digital image where the sharpened luminance is low. These regions may include noise that could be amplified by the sharpening filter.

The adaptive sharpening filter combines the three alpha submasks to generate the alpha mask. Then, the digital image is combined with the sharpened image to generate an adaptively sharpened image.

One advantage of the disclosed methods is that they provide an adaptive sharpening filter that improves overall image sharpness, but reduces the incidence of sharpening artifacts relative to prior art image sharpening techniques.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

What is claimed is:

1. A non-transitory computer-readable medium including instructions that, when executed by a processing unit, cause the processing unit to sharpen a digital image that is H pixels in height and W pixels in width, by performing the steps of:
   generating a plurality of luminance values for a portion of the digital image, wherein each luminance value corresponds to a different pixel location in the portion of the digital image;
   generating a plurality of sharpened luminance values for the portion of the digital image by applying a sharpening filter to one or more of the luminance values, wherein each sharpened luminance value corresponds to a different pixel location in the portion of the digital image; and
   generating a sharpened digital image for output to a display or for storage in a memory by selecting, for each pixel location in the portion of the digital image, either the luminance value in the plurality of luminance values corresponding to the pixel location or the sharpened luminance value in the plurality of sharpened luminance values corresponding to the pixel location based on a value in an alpha mask corresponding to the pixel location, wherein the alpha mask is derived from at least one of, an overshoot alpha submask, a fringe alpha submask, and a dark alpha submask.

2. The non-transitory computer-readable medium of claim 1, wherein the overshoot alpha submask includes, for each pixel location in the portion of the digital image, an overshoot value that is indicative of how strongly an overshoot artifact is detected at the pixel location.

3. The non-transitory computer-readable medium of claim 1, wherein the fringe alpha submask includes, for each pixel location in the portion of the digital image, a fringe value that is indicative of how strongly a fringe artifact is detected at the pixel location.

4. The non-transitory computer-readable medium of claim 1, wherein the dark alpha submask includes, for each pixel location in the portion of the digital image, a dark value that is indicative of how strongly a dark artifact is detected at the pixel location.

5. The non-transitory computer-readable medium of claim 1, wherein the portion of the digital image comprises every pixel in the digital image.

6. The non-transitory computer-readable medium of claim 1, wherein the alpha mask is derived from at least two of the overshoot alpha submask, the fringe alpha submask, and the dark alpha submask.

7. The non-transitory computer-readable medium of claim 1, wherein the alpha mask is derived from the overshoot alpha submask, the fringe alpha submask, and the dark alpha submask.

8. The non-transitory computer-readable medium of claim 7, further comprising the step of generating the alpha mask by:
  generating a submask sum for each pixel location in the portion of the digital image by adding the overshoot value from the overshoot alpha submask at the pixel location to the fringe value from the fringe alpha submask at the pixel location;
  generating a limited submask sum for each pixel location in the portion of the digital image by limiting each value in the submask sum to a value less than 1;
  generating a reverse submask by subtracting the value of the limited submask sum at each pixel location in the portion of the digital image from 1;
  generating a reverse dark alpha submask by subtracting the dark value of the dark alpha submask at each pixel location in the portion of the digital image from 1; and
  for each pixel location in the portion of the digital image, multiplying the value of the reverse submask at each pixel location with the corresponding value of the reverse dark alpha submask at the pixel location.

9. The non-transitory computer-readable medium of claim 8, wherein the step of generating the sharpened digital image comprises:
  generating a reverse alpha mask by subtracting the value of the alpha mask at each pixel location in the portion of the digital image from 1;
  generating a first luminance portion for each pixel location in the portion of the digital image by multiplying the sharpened luminance value at the pixel location by the value of the reverse alpha mask at the pixel location;
  generating a second luminance portion for each pixel location in the portion of the digital image by multiplying the luminance value at the pixel location by the value of the alpha mask at the pixel location; and
  generating an adaptively sharpened luminance value for each pixel location in the portion of the digital image by adding the value of the first luminance portion at the pixel location to the value of the second luminance portion at the pixel location.

10. The non-transitory computer-readable medium of claim 1, wherein each pixel included in the portion of the digital image comprises red, green and blue (RGB) color values, and further comprising the steps of:
  converting the portion of the digital image to a luminance and chrominance (YUV) format prior to the step of generating the plurality of sharpened luminance values; and
  converting the generated sharpened digital image from a YUV format to an RGB format.

11. The non-transitory computer-readable medium of claim 1, wherein a first overshoot artifact is formed when a first region of pixels in the portion of the digital image resides in between second and third regions of pixels in the portion of the digital image, and the average of the sharpened luminance values associated with the first region of pixels in the portion of the digital image is less than the average of the sharpened luminance values associated with the second and third regions of pixels in the portion of the digital image, and the average of the sharpened luminance values associated with the second region of pixels in the portion of the digital image is different than the average of the sharpened luminance values associated with the third region of pixels in the portion of the digital image.

12. The non-transitory computer-readable medium of claim 1, wherein each pixel included in the portion of the digital image comprises red, green and blue (RGB) color values, and a first fringe artifact is formed when a first region of pixels in the portion of the digital image resides between second and third regions of pixels in the portion of the digital image, and the average of the red color values associated with the first region of pixels in the portion of the digital image is greater than the average of the blue color values associated with the first region of pixels in the portion of the digital image and is greater than the average of the green color values associated with the first region of pixels in the portion of the digital image and is greater than the average of the red color values associated with either the second region of pixels or the third region of pixels in the portion of the digital image, and the average of the red color values associated with the second region of pixels in the portion of the digital image is different than the average of the red color values associated with the third region of pixels in the portion of the digital image.

13. The non-transitory computer-readable medium of claim 1, further comprising the step of generating the dark alpha submask by:
  deriving a first set of dark values from the plurality of luminance values, wherein each dark value in the first set of dark values corresponds to a pixel location in the portion of the digital image having a luminance value that is less than or equal to a threshold;
  deriving a second set of dark values from the plurality of luminance values, wherein each dark value in the second set of dark values corresponds to a pixel location in the portion of the digital image having a luminance value that is greater than the threshold; and
  combining the first set of dark values and the second set of dark values to create the dark alpha submask.

* * * * *

UNITED STATES PATENT AND TRADEMARK OFFICE
CERTIFICATE OF CORRECTION

PATENT NO. : 8,260,078 B2
APPLICATION NO. : 12/353932
DATED : September 4, 2012
INVENTOR(S) : Kalman It is certified that error appears in the above-identified patent and that said Letters Patent is hereby corrected as shown below:

In Detailed Description:
Column 7, Line 61, please delete "cc" and insert --$\alpha$-- therefor;

Column 15, Line 8, please delete "are" after are.

Signed and Sealed this
Fifth Day of February, 2013

Teresa Stanek Rea
*Acting Director of the United States Patent and Trademark Office*